United States Patent [19]
Tabata et al.

[11] Patent Number: 5,841,201
[45] Date of Patent: Nov. 24, 1998

[54] HYBRID VEHICLE DRIVE SYSTEM HAVING A DRIVE MODE USING BOTH ENGINE AND ELECTRIC MOTOR

[75] Inventors: Atsushi Tabata, Okazaki; Yutaka Taga, Aichi-ken; Ryuji Ibaraki, Toyota; Tsuyoshi Mikami, Toyota; Hiroshi Hata, Toyota, all of Japan

[73] Assignee: Toyota Jidosha Kabushiki Kaisha, Toyota, Japan

[21] Appl. No.: 805,164

[22] Filed: Feb. 24, 1997

[30] Foreign Application Priority Data

Feb. 29, 1996 [JP] Japan ................................ 8-042943
May 27, 1996 [JP] Japan ................................ 8-132105

[51] Int. Cl.$^6$ ........................................................ H02P 9/04
[52] U.S. Cl. ..................... 290/40 C; 180/65.4; 290/16; 290/27; 318/143; 322/16
[58] Field of Search .................................. 290/11, 16, 27, 290/40 C; 180/65.1, 65.4; 318/139, 143; 322/14, 15, 16

[56] References Cited

U.S. PATENT DOCUMENTS

| | | | |
|---|---|---|---|
| 5,176,213 | 1/1993 | Kawai et al. ............................ | 180/243 |
| 5,343,970 | 9/1994 | Severinsky ............................. | 180/65.2 |
| 5,545,928 | 8/1996 | Kotani ................................... | 290/40 C |
| 5,550,445 | 8/1996 | Nii ........................................ | 318/153 |
| 5,588,498 | 12/1996 | Kitada ................................... | 180/65.4 |
| 5,621,304 | 4/1997 | Kiuchi et al. ............................ | 322/18 |
| 5,650,931 | 7/1997 | Nii ................................... | 364/424.026 |
| 5,656,921 | 8/1997 | Farrall .................................. | 322/40 |
| 5,698,955 | 12/1997 | Nii ........................................ | 318/139 |
| 5,722,911 | 3/1998 | Ibaraki et al. ............................ | 477/3 |
| 5,751,137 | 5/1998 | Kiuchi et al. ............................ | 322/14 |

FOREIGN PATENT DOCUMENTS

A-3-121928 5/1991 Japan .
A-6-80048 3/1994 Japan .

*Primary Examiner*—Steven L. Stephan
*Assistant Examiner*—Nicholas Ponomarenko
*Attorney, Agent, or Firm*—Oliff & Berridge, PLC

[57] ABSTRACT

A hybrid drive system for a motor vehicle, having a power drive state in which there is available a power drive mode in which an engine and an electric motor are both operated as a drive power source for driving the vehicle, and wherein a manually operated power drive selector is provided for selecting the power drive mode, and a power drive restricting device is provided to inhibit the vehicle from being driven in the power drive state and therefore in the power drive mode if the power drive selector is not manually operated. The hybrid drive system may have an engine assist drive mode in which the electric motor is operated as an auxiliary drive power source, together with the engine operated as a primary drive power source, according to a selected one of different drivability modes of the vehicle selected by a manually operated drivability performance selector.

12 Claims, 21 Drawing Sheets

FIG. 12

| SHIFT LEVER | TRANSMISSION | CLUTCHES | | | BRAKES | | | | | ONE-WAY CLUTCHES | | | SPEED RATIO |
|---|---|---|---|---|---|---|---|---|---|---|---|---|---|
| | | $C_0$ | $C_1$ | $C_2$ | $B_0$ | $B_1$ | $B_2$ | $B_3$ | $B_4$ | $F_0$ | $F_1$ | $F_2$ | |
| NEUTRAL | N | ○ | | | | | | | | | | | — |
| REVERSE | Rev 1 | ○ | | ○ | | | | | ○ | ○ | | | −4.550 |
| | Rev 2 | | | ○ | ○ | | | | ○ | | | | −3.431 |
| DRIVE | 1st | ○ | ○ | | | | | | ● | ○ | | ○ | 3.357 |
| | 2nd | ● | ○ | | | | | ○ | | ○ | | | 2.180 |
| | 3rd | ○ | ○ | | | ● | ○ | | | ○ | | | 1.424 |
| | 4th | ○ | ○ | | ○ | | ○ | | | ○ | ○ | | 1.000 |
| | 5th | | ○ | ○ | ○ | | ○ | | | | | | 0.753 |

FIG. 16

| MODE | CLUTCHES | | ENGINE 12 | STORAGE DEVICE 58 | MODE NOMENCLATURE |
| --- | --- | --- | --- | --- | --- |
| | CE1 | CE2 | | | |
| 1 | OFF | ON | OFF | DISCHARGED | MOTOR DRIVE |
| 2 | ON | ON | ON | NO ENG. CSMD | ENGINE DRIVE |
| 3 | ON | ON | ON | CHARGED | ENGINE DRIVE + CHARGING |
| 4 | ON | ON | ON | DISCHARGED | ENGINE · MOTOR DRIVE |
| 5 | ON | OFF | ON | CHARGED | VEHICLE START BY ENGINE |
| 6 | OFF | ON | OFF | CHARGED | REGENERATIVE BRAKING |
| 7 | ON | OFF | ON | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING |

FIG. 24

| SHIFT LEVER | TRANSMISSION | CLUTCHES | | BRAKES | | | | ONE-WAY CLUTCHES | | SPEED RATIO |
|---|---|---|---|---|---|---|---|---|---|---|
| | | C₁ | C₂ | B₁ | B₂ | B₃ | B₄ | F₁ | F₂ | |
| NEUTRAL | N | | | | | | | | | — |
| REVERSE | Rev | | ○ | | | | ○ | | | −4.550 |
| DRIVE | 1st | ○ | | ● | | | | | ○ | 3.357 |
| | 2nd | ○ | | | | ○ | | | | 2.180 |
| | 3rd | ○ | | | ○ | | | ○ | | 1.424 |
| | 4th | ○ | ○ | | ○ | | | | | 1.000 |

# HYBRID VEHICLE DRIVE SYSTEM HAVING A DRIVE MODE USING BOTH ENGINE AND ELECTRIC MOTOR

This application is based on Japanese Patent Applications No. 8-42943 filed Feb. 29, 1996 and No. 8-132105 filed May 27, 1996, the contents of which are incorporated hereinto by reference.

CROSS REFERENCE TO RELATED APPLICATIONS

U.S. patent application Ser. No. 08/685,102 filed Jul. 22, 1996

BACKGROUND OF THE INVENTION

1. Field of the Invention

The present invention relates in general to a hybrid drive system for driving a motor vehicle, and more particularly to such a hybrid vehicle drive system having a power drive state in which the vehicle is driven by both an engine and an electric motor, or an engine assist drive mode in which the electric motor cooperates with the engine to serve as a drive power source.

2. Discussion of the Related Art

For driving a motor vehicle, there is known a hybrid drive system which includes, as drive power sources, an engine operated by combustion of a fuel, and an electric motor operated by an electric energy stored in an electric energy storage device. Such a hybrid drive system has an engine drive mode in which the engine is operated to drive the vehicle, and a motor drive mode in which the electric motor is operated to drive the vehicle. The engine drive mode and the motor drive mode are selectively established depending upon the running condition of the vehicle, so as to reduce the amount of consumption of the fuel and the amount of exhaust gas emission from the engine. For further reducing the fuel consumption and the exhaust gas emission, there is proposed a hybrid drive system which has a so-called "power drive mode" in which the engine and the electric motor are both operated to drive the vehicle so as to restrict the maximum output of the engine. This power drive mode is established when a load acting on the vehicle is relatively high, for example, during running of the vehicle on an uphill road. An example of this type of hybrid drive system is disclosed in JP-A-6-80048, wherein the power drive state is established when the accelerator pedal is operated by a relatively large amount by the vehicle operator, namely, when the vehicle load is relatively high.

However, the conventional hybrid drive system described above may suffer from an insufficient drive force in the power drive mode, due to a reduced amount of the electric energy stored in the electric energy storage device, which causes a reduced output of the electric motor even when the amount of operation of the accelerator pedal by the vehicle operator is relatively large. This tendency gives a discomfort to the vehicle operator who expects a sufficient drive force upon depression of the accelerator pedal by a relatively large amount. In other words, the conventional hybrid drive system tends to suffer from a variation in the drive force in the power drive mode, due to a varying amount of the stored electric energy, even when the running condition of the vehicle is substantially constant.

There is also known a hybrid drive system wherein the electric motor is operated as needed, to assist the engine during running of the vehicle by the engine. An example of this type of hybrid drive system is disclosed in JP-A-3-121928. In this system, the engine is normally operated as the drive power source for driving the vehicle, and the electric motor is also operated to assist the engine only when the engine load (as represented by the amount of operation of the accelerator pedal) exceeds a given upper limit. This system assures desired drivability of the vehicle while reducing the amount of fuel consumption and the amount of exhaust gas emission.

In the above hybrid drive system having the engine assist function, however, the electric motor is necessarily operated as long as the engine load is higher than the predetermined upper limit. This arrangement tends to suffer from relatively high frequency of operation of the electric motor and relatively large amount of consumption of the electric energy, requiring the electric energy storage device to have a comparatively large capacity and to be charged relatively frequently by the engine.

SUMMARY OF THE INVENTION

It is therefore a first object of the present invention to provide a hybrid drive system for a motor vehicle, which does not give a discomfort to the vehicle operator even when the operation of the electric motor is limited due to reduced amount of the electric energy stored in the electric energy storage device.

It is a second object of the invention to provide a hybrid drive system which is adapted to reduce the frequency of operation of the electric motor and minimize the amount of consumption of the electric energy by the electric motor, while permitting the motor vehicle to be driven with drivability performance or drive force as desired by the vehicle operator.

The first object may be achieved according to the first aspect of the present invention, which provides a hybrid drive system for a motor vehicle, comprising: (a) an engine operated by combustion of a fuel; (b) an electric energy storage device for storing an electric energy; (c) an electric motor operated with the electric energy stored in the electric energy storage device; (d) normal drive control means for controlling the engine and the electric motor so as to establish a normal drive state in which one of the engine and the electric motor is operated as a drive power source to drive the motor vehicle; (e) power drive control means for controlling the engine and the electric motor so as to establish a power drive state in which there is available a power drive mode in which both of the engine and the electric motor are operated as the drive power source to drive the motor vehicle; (f) power drive selecting means manually operated by an operator of the motor vehicle when the operator desires to drive the motor vehicle in the power drive mode; and (g) power drive restricting means for permitting the power drive control means to establish the power drive state if the power drive selecting means is operated, and inhibiting the power drive control means from establishing the power drive state, to thereby inhibit the motor vehicle from being driven in said power drive mode, if the power drive selecting means is not manually operated.

In the hybrid drive system for a motor vehicle, the power drive mode is available in the power drive state. However, the power drive state is not established when the power drive selecting means is not manually operated. Therefore, when the power drive selecting means is not operated, the vehicle is not driven in the power drive mode in which the engine and the electric motor are both operated as the drive power source for driving the vehicle. In other words, the vehicle is driven by only the engine or the electric motor when the power drive selecting means is not manually operated. If the electric motor cannot be operated to provide a sufficient drive force due to reduction of the electric energy amount stored in the electric energy storage device while the power drive selecting means is not operated, the vehicle is driven by the engine used as the drive power source. In this case where the manually operable power drive selecting means is not operated, the vehicle operator recognizes that the power drive mode is not available, and does not feel that the vehicle drive force is unexpectedly small. When the power drive selecting means is manually operated, the vehicle is driven in the power drive mode with the engine and the electric motor if the appropriate condition is satisfied, for example, the stored electric energy is sufficient to operate the electric motor. Thus, only when excessive reduction of the stored electric energy occurs while the power drive selecting means is operated, the vehicle driver may feel that the vehicle drive force is smaller than expected upon depression of the accelerator pedal with the power drive selecting means being operated to select the power drive mode.

The principle of the first aspect of the present invention is applicable to various types of hybrid drive system equipped with the engine and the electric motor as the drive power source for driving the motor vehicle. One or both of the engine and the electric motor may be used as the drive power source, by selective connection and disconnection of appropriate power transmission paths by selective engagement and disengagement of clutches, or by a synthesizer and distributor mechanism such as a planetary gear mechanism for synthesizing or distributing the outputs of the engine and electric motor, or by suitable means for using the electric motor as an auxiliary drive power source to assist the engine as a primary power source. In any case, the hybrid drive system has the normal drive state in which the vehicle is driven by only one of the engine or the electric motor, and the power drive state in which the vehicle can be driven in the power drive mode using both of the engine and the electric motor. The electric motor may be provided for each of the drive wheels of the motor vehicle.

In the normal drive state established by the normal drive control means, the vehicle may be driven in an engine drive mode using the engine as the drive power source, or in a motor drive mode using the electric motor as the drive power source. Preferably, the engine drive mode and the motor drive mode are selectively established depending upon the running condition of the vehicle, so as to reduce the amount of exhaust gas emission. However, the engine is always used as a primary power source, with the electric motor being used as an auxiliary power source which is operated when needed. In the power drive state established by the power drive control means when the power drive selecting means is operated, at least the power drive mode is available for driving the vehicle with both of the engine and the electric motor. This power drive mode may be established irrespective of the running condition of the vehicle, as long as the power drive selecting means is operated. For reducing the amount of exhaust gas emission, however, it is desirable that the power drive mode be established only when the predetermined condition is satisfied while the power drive selecting means is operated.

The power drive selecting means is operated by the vehicle operator according to the desire of the vehicle operator regarding the drive force produced by the hybrid drive system. The power drive selecting means may comprise a selector switch provided on an instrument panel of the vehicle, or on a pushbutton provided on a grip of a shift lever for shifting a transmission provided on the vehicle. The power drive selecting means may be provided as one of the operating positions of a transmission shift lever.

According to one preferred form of this invention, the power drive restricting means is adapted to command the normal drive control means to establish the normal drive state if the power drive selecting means is not manually operated.

According to another preferred form of the invention, the hybrid drive system further comprises: (h) power drive mode inhibiting means for inhibiting the power drive control means from establishing the power drive mode and for operating only the engine as the drive power source for driving the motor vehicle, if an amount of the electric energy stored in the electric energy storage device is smaller than a predetermined lower limit, even when the power drive selecting means is manually operated; and (i) indicating means for informing the operator of the motor vehicle that the motor vehicle is inhibited from being driven in the power drive mode, when the power drive control means is inhibited by the power drive mode inhibiting means from establishing the power drive mode.

In the above preferred form of the invention, the running of the vehicle in the power drive mode is inhibited when the stored electric energy amount is smaller than the lower limit, even when the power drive selecting means is operated. This arrangement is effective to prevent damaging of the electric energy storage device, and excessive reduction of the charging and discharging efficiencies of the storage device. Further, the indicating means provides an indication that the power drive mode is not available when the stored electric energy amount is smaller than the lower limit. This arrangement permits the vehicle operator to recognize that the vehicle is driven by only the engine even though the vehicle operator has manipulated the power drive selecting means to select the power drive mode. This arrangement does not give a discomfort to the vehicle operator even if the vehicle drive force as felt by the vehicle drive is smaller than expected.

The lower limit of the stored electric energy amount below which the running of the vehicle in the power drive mode is inhibited by the power drive mode inhibiting means is determined to prevent excessive deterioration of the charging and discharging efficiencies of the electric energy storage device due to excessive reduction of the stored electric energy amount, which may result in damaging the storage device. The power drive mode inhibiting means may be operable only when the power drive state is established by the power drive control means. However, the power drive mode inhibiting means may be operable in both of the normal drive state and the power drive state. In this case, the electric motor is inhibited from operating or stopped, and the vehicle is driven by only the engine, if the stored electric energy amount falls below the lower limit, irrespective of whether the hybrid drive system is in the normal drive state or in the power drive state. The indicating means may be an indicator disposed on the vehicle instrument panel, for providing a visual or audible indication. The indicating means may be activated as long as the running of the vehicle in the power drive mode is inhibited. However, the indicating means may be activated only when the power mode selecting means is manually operated and the running of the vehicle in the power drive mode is inhibited by the power drive mode inhibiting means.

The second object indicated above may be achieved according to a second aspect of this invention, which provides a hybrid drive system for a motor vehicle, comprising:

(a) an engine operated by combustion of a fuel; (b) an electric motor operated by an electric energy; (c) engine assist control means operable in an engine assist mode, for controlling the electric motor such that the electric motor is operated as needed, as an auxiliary drive power source, together with the engine, to assist the engine to drive the motor vehicle, during running of the motor vehicle with the engine operated as a primary drive power source; and (d) drivability performance selecting means manually operated by an operator of the motor vehicle, for selecting one of a plurality of drivability modes of the motor vehicle, and wherein the engine assist control means includes assist torque changing means for changing an amount of an assist torque which is produced by the electric motor and which is added to a torque of the engine in the engine assist mode. The assist torque changing means changing the amount of the assist torque according to the one of the drivability modes of the motor vehicle selected by the drivability performance selecting means.

In the hybrid drive system according to the second aspect of this invention constructed as described above, the amount of the assist torque produced by the electric motor and added to the torque of the engine in the engine assist drive mode is changed by the assist torque changing means of the engine assist control means, according to or depending upon the selected one of the drivability modes of the motor vehicle which is selected by the vehicle operator by the drivability performance selecting means. Thus, the present hybrid drive system assures reduced frequency of operation of the electric motor and reduced amount of consumption of the electric energy by the electric motor, while permitting the vehicle to be driven with drivability performance or drive force as desired by the vehicle operator.

The principle of the above second aspect of the present invention is applicable to various types of hybrid drive system which are equipped with the engine and the electric motor as the drive power source for driving the motor vehicle and which are adapted such that one or both of the engine and the electric motor may be used as the drive power source, by selective connection and disconnection of appropriate power transmission paths by selective engagement and disengagement of clutches, or by a synthesizer and distributor mechanism such as a planetary gear mechanism for synthesizing or distributing the outputs of the engine and electric motor. In any case, the hybrid drive system has the engine assist drive mode in which the electric motor is operated as an auxiliary drive power source, together with the engine, to assist the engine to drive the motor vehicle, during running of the motor vehicle with the engine operated as a primary drive power source. The electric motor may be provided for each of the drive wheels of the motor vehicle.

The hybrid drive system according to the second aspect of the invention should have the engine assist drive mode in which the electric motor is used as the auxiliary drive power source to assist the engine which serves as the primary drive power source. However, the present hybrid drive system may have other drive modes such as an engine drive mode in which only the engine is operated to drive the vehicle. In this case, one of the drive modes is selected depending upon the running condition of the vehicle, such as the operation amount of the accelerator pedal, running speed of the vehicle, and amount of electric energy stored in an electric energy storage device. The engine may preferably use a throttle valve whose opening angle is electrically controlled according to the operation amount of the accelerator pedal. Where the engine is always used as the drive power source, however, the engine may use a throttle valve which is mechanically connected to the accelerator pedal so that the opening angle of the throttle valve is changed as the accelerator pedal is operated. In either case, the opening angle of the throttle valve, which represents the engine output currently required by the vehicle operator, generally has a given relationship with the operation amount of the accelerator pedal. Therefore, the currently required output of the engine may be represented by the opening angle of the throttle valve, or an intake air quantity of the engine.

The total vehicle drive force in the engine assist drive mode is a sum of the assist torque produced by the electric motor and the torque produced by the engine. The engine assist control means is adapted to control the electric motor in the engine assist drive mode such that the total vehicle drive force continuously smoothly increases with an increase in the currently required output of the engine as represented by the operation amount of the accelerator pedal, over substantially the entire range of the operation amount of the accelerator pedal, for example. The pattern of change of the assist torque produced by the engine with respect to the currently required output of the engine is determined with the output characteristics of the engine taken into account. Usually, the engine output substantially linearly increases with the engine load when the engine load is relatively low. When the engine load is relatively high, the rate of increase of the engine output is reduced, and the engine output does not substantially linearly increase with the engine load. In the light of this fact, the electric motor is not operated as the auxiliary drive power source to assist the engine while the engine load is relatively low, that is, while the currently required output of the engine is relatively small. When the engine load is relatively high, the engine assist control means operates the electric motor to assist the engine in the engine assist drive mode such that the total vehicle drive torque continuously smoothly increases with an increase in the engine load, namely, with an increase in the currently required output of the engine. In particular, the assist torque changing means is adapted to increase the assist torque so that the total vehicle drive force smoothly increase with the engine load.

The drivability performance selecting means may be a selector switch exclusively provided for selecting a desired one of the two or more drivability modes of the vehicle. However, the drivability performance selecting means may be a shift pattern selector switch provided for selecting one of a plurality of shift patterns of an automatic transmission provided in the hybrid drive system. In this case, the shift patterns of the transmission include a power drive shift pattern which is selected when the vehicle driver desires to drive the vehicle with relatively high drivability, and a normal drive shift pattern which is selected when the vehicle operator desires to drive the vehicle with relatively high fuel economy, for example. Alternatively, a shift lever for shifting a transmission may serve as the drivability performance selecting means. That is, the shift lever has a manual-mode position (so-called "sporty mode", for example) in which the transmission may be manually shifted to a desired position. In this case, the vehicle can be driven with a higher degree of drivability when the shift lever is placed in the manual-mode position, than when the shift lever is normally placed in the drive position in which the transmission is automatically shifted depending upon the running condition of the vehicle. Thus, the shift lever can serve as the drivability performance selecting means for selecting one of a plurality of drivability modes of the vehicle. In this respect, it is noted that the present hybrid drive system preferably includes an automatic transmission which has different speed ratios and which is disposed between the engine and drive wheels of the vehicle. However, the automatic transmission is not essential.

The assist torque changing means of the engine assist control means may be adapted to change the assist torque such that the amount of the assist torque is larger when the power drive shift pattern is selected for the automatic transmission or when the shift lever is placed in the manual-mode position is selected, than when the normal drive shift pattern is selected or when the shift lever is placed in the drive position. However, the engine assist control means may be adapted to operate the electric motor only when the power drive shift pattern or the manual-mode position is selected. In this case, the electric motor is not operated when the power drive shift pattern or the manual-mode position is not selected. That is, the assist torque may be zero in the engine assist drive mode.

According to a first preferred form of the invention according to the second aspect of this invention, the drivability performance selecting means has a first position for selecting a relatively high degree of drivability of the motor vehicle, and a second position for selecting a relatively low degree of drivability of the motor vehicle, and the assist torque changing means of the engine assist control means is adapted to initiate an operation of the electric motor as the auxiliary drive power source when the drivability performance selecting means is operated to the first position, and to terminate the operation of the electric motor as the auxiliary drive power source when the drivability performance selecting means is operated to the second position.

According to a second preferred form of the invention according to the second aspect of the invention, the engine assist control means further comprises engine assist control initiation control means for inhibiting initiation of an operation of the electric motor as the auxiliary drive power source when an output of the engine currently required by the vehicle operator is in the process of decreasing, and engine assist control termination control means for inhibiting termination of the operation of the electric motor as the auxiliary drive power source when the output of the engine currently required by the vehicle operator is in the process of increasing.

In the above second preferred form of the invention, the electric motor is not operated as the auxiliary drive power source, when the currently required output of the engine is decreasing, namely, when the vehicle operator desires to decrease the vehicle drive force. This arrangement is effective to prevent an unexpected increase of the vehicle drive force by the operation of the electric motor as the auxiliary drive power source when the vehicle operator desires to decrease the vehicle drive force. Further, the operation of the electric motor as the auxiliary drive power source is not terminated, when the currently required output of the engine is increasing, namely, when the vehicle operator desires to increase the vehicle drive force. This arrangement is effective to prevent an unexpected decrease of the vehicle drive force by the termination of the operation of the electric motor when the vehicle operator desires to increase the vehicle drive force.

The assist torque changing means is preferably adapted to increase the assist torque of the electric motor when the currently required output of the hybrid drive system is increasing, namely, when the vehicle operator desires to increase the vehicle drive force, and decrease the assist torque when the currently required output of the hybrid drive system is decreasing, namely, when the vehicle operator desires to decrease the vehicle drive force.

BRIEF SUMMARY OF THE INVENTION

The above and other objects, features, advantages and technical and industrial significance of this invention will be better understood by reading the following detailed description of presently preferred embodiments of the invention, when considered in connection with the accompanying drawings, in which:

FIG. 12 is a block indicating operating states of various coupling elements for establishing different operating positions of an automatic transmission in the hybrid drive system of FIG. 10;

FIG. 16 is a view indicating nine operating modes which are selectively established in the sub-routine of FIG. 15;

FIG. 24 is a view indicating operating states of coupling elements for establishing operating positions of the automatic transmission in the hybrid drive system of FIG. 24.

DETAILED DESCRIPTION OF THE PREFERRED EMBODIMENTS

Figure 1:
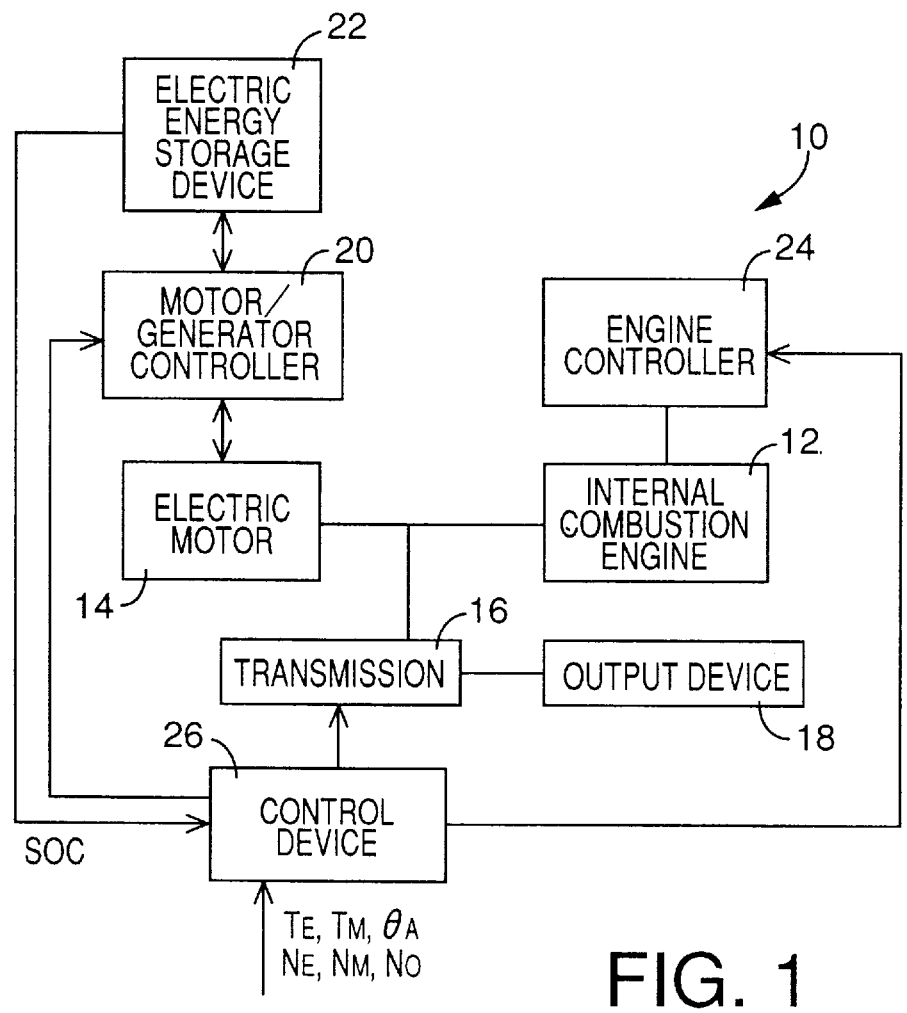
FIG. 1 is a block diagram illustrating an arrangement of a hybrid drive system for a motor vehicle, which is constructed according to one embodiment of this invention.

Referring first to FIG. 1, a hybrid drive system 10 for a motor vehicle according to one embodiment of the present invention will be described. The hybrid drive system 10 is equipped with two drive sources, one of which is an internal combustion engine 12 such as a gasoline engine operated by combustion of a fuel, and the other of which is a dynamo-electric motor 14 which functions as an electric motor and an electric generator (dynamo). The dynamo-electric motor 14 will be hereinafter referred to simply as "electric motor 14". Power of the engine 12 and power of the electric motor 14 are simultaneously or selectively transferred to a transmission 16, and to right and left drive wheels via a drive force output device 18. The transmission 16 may include a speed reducing mechanism, a forward/reverse switching mechanism and a differential gear mechanism. The speed reducing mechanism may be adapted to change the speed ratio either in steps or continuously, or may have a predetermined speed ratio. The forward/reverse switching mechanism has a forward drive position for forward running of the motor vehicle, and a reverse drive position for rearward or backward running of the vehicle. The electric motor 14 may be operated bidirectionally, so that the vehicle may be run backward by operation of the electric motor 14 in the reverse direction. Appropriate clutch or clutches may be disposed between the engine 12 and the motor 14, and/or between these drive source or sources 12, 14 and the transmission 16, so that the drive sources 12, 14 and transmission 16 are disconnected from each other as needed.

Figure 2:
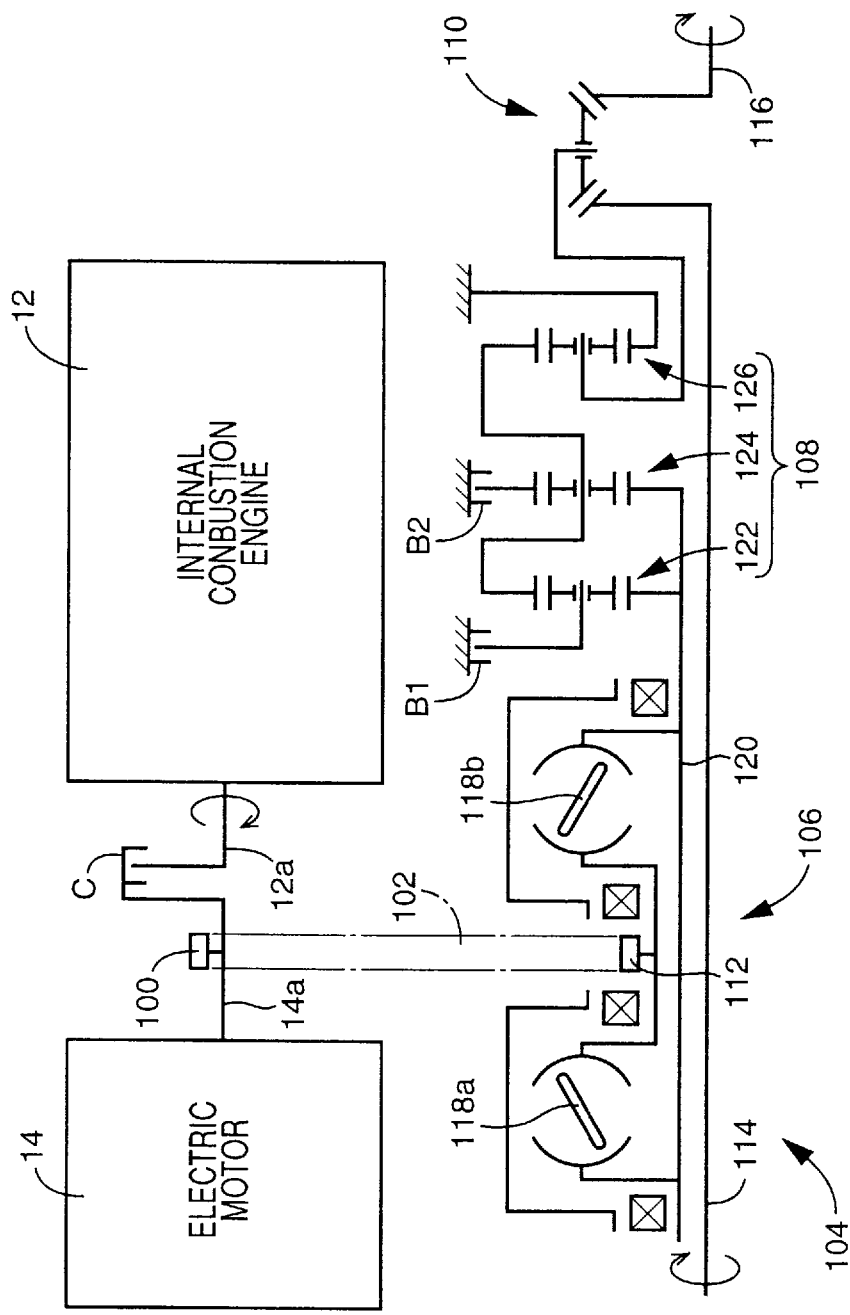
FIG. 2 is a schematic block diagram illustrating examples of a transmission and an drive force output device which are employed in the hybrid drive system of FIG. 1.

Referring next to FIG. 2, examples of the transmission 16 and the drive force output device 18 are illustrated. The hybrid drive system 10 shown in FIG. 2 is adapted to be installed on the motor vehicle such that the axes of the engine 12 and motor 14 are substantially parallel to the transverse direction (direction of width) of the vehicle. This positioning of the hybrid drive system is usually employed on a front-engine front-drive (FF) vehicle. The engine 12 and motor 14 are disposed in series on a common first axis, in a mutually facing relation with each other. The engine 12 and motor 14 have respective output shafts 12a, 14a, which are rotated together when a clutch C disposed therebetween is engaged. The output shaft 14a of the electric motor 14 has a sprocket 100 fixed thereto, which is connected by a chain 102 to a power transmission device 104. The power transmission device 104 includes a continuously variable transmission 106 of toroidal type, a speed reducing and reversing mechanism 108 of planetary gear type, and a differential gear device 110 of bevel gear type, which are disposed in series on a second axis parallel to the first axis indicated above. The chain 102 is connected to the continuously variable transmission 106 via a driven sprocket 112. Rotary motion received by the transmission 106 is transferred to a pair of output shafts 114, 116 connected to the drive wheels, via the speed reducing and reversing mechanism 108 and the differential gear device 110. The output shafts 114, 116 are disposed on the second axis, namely, coaxial with the transmission 106, mechanism 108 and differential gear device 110.

It will be understood that the continuously variable transmission 106 of toroidal type is an example of the transmission 16 shown in FIG. 1, while the speed reducing and reversing mechanism 108 and the differential gear device 110 are an example of the drive force output device 18 shown in FIG. 1.

The continuously variable transmission 106 of toroidal type is adapted to transmit a torque via a traction oil having relatively high degrees of viscosity and elasticity. The transmission 106 shown in FIG. 2 is a double-cavity type toroidal transmission including variators 118a, 118b in the form of rollers. The slant angles of the variators 118a, 118b are continuously variably controlled by suitable hydraulic actuators, for example, so as to continuously vary the speed ratio with respect to an output shaft 120.

The speed reducing and reversing mechanism 108 includes three simple planetary gear sets 122, 124, 126, a rear drive brake B1 and a front drive brake B2. The output shaft 120 of the toroidal type continuously variable transmission 106 is connected integrally to sun gears of the planetary gear sets 122, 124. When a shift lever (not shown) provided on the vehicle is operated to a reverse position, the rear drive brake B1 is engaged while the front drive brake B2 is released, whereby the mechanism 108 is placed in its rear drive position for driving the vehicle in the forward direction. When the shift lever is operated to one of forward drive positions, the front drive brake B2 is engaged while the rear drive brake B1 is released, whereby the mechanism 108 is placed in its front drive position for driving the vehicle in the backward direction. When the shift lever is operated to its neutral position, the two brakes B1, B2 are both released, whereby the mechanism 108 is placed in its neutral position. The forward and rear drive positions of the speed reducing and reversing mechanism 108 have appropriate speed reduction ratios for reducing the input speed. The output of the mechanism 108 is transferred from the carrier of the simple planetary gear set 126 to the differential gear device 110. In the present specific example of FIG. 2, the three planetary gear sets 122, 124, 126 have the same gear diameter and the same gear ratio. However, the gear diameters of these planetary gear sets 122, 124, 126 may be suitably selected to give the mechanism 108 a desired speed ratio. The drive force output device 104 is symmetrical with respect to its centerline, namely, with respect to the second axis, and the only the upper half of the device 104 is shown in FIG. 2.

Referring back to the block diagram of FIG. 1, the electric motor 14 is connected to an electric energy storage device (electric power supply device) 14 in the form of a battery, for example, through a motor/generator controller 20 so that the electric motor 14 is selectively placed in a DRIVE state, a CHARGING state, and a NON-LOAD state. In the DRIVE state, the motor 14 is driven by an electric energy supplied from the electric energy storage device 22. In the CHARGING state, the motor 14 functions as an electric generator or dynamo, with regenerative braking (braking torque electrically generated by the motor 14 per se), for storing an electric energy in the electric energy storage device 22. In the NON-LOAD state, the output shaft 14a of the motor 14 is permitted to rotate freely. The internal combustion engine 12 is controlled by an engine controller 24, which includes an actuator for controlling the amount of a fuel injected into the engine 12, an actuator for controlling a throttle valve of the engine 12, an actuator for controlling the ignition timing of the engine 12, and an actuator for controlling suction and exhaust valves of the engine 12. The motor/generator controller 20 and the engine controller 24 are controlled by a control device 26.

The control device 26 includes a microcomputer incorporating a central processing unit (CPU), a random-access memory (RAM), and a read-only memory (ROM). The CPU operates according to control programs stored in the ROM while utilizing a temporary data storage function of the RAM. The control device 26 is selectively placed in one of four modes, namely, an ENGINE drive mode, a MOTOR DRIVE mode, an ENGINE·MOTOR drive mode and an ENGINE DRIVE & CHARGING mode. In the ENGINE DRIVE mode, only the internal combustion engine 12 is operated as the drive power source to drive the vehicle. In the MOTOR DRIVE mode, only the electric motor 14 is operated as the drive power source for driving the vehicle. In the ENGINE·MOTOR DRIVE mode, the engine 12 and the electric motor 14 are both operated as the drive power sources to drive the vehicle. In the ENGINE DRIVE & CHARGING mode, only the engine 12 is operated as the drive power source for driving the vehicle while the electric motor 14 is driven as the electric generator by the engine 12 so as to charge the electric energy storage device 22 with the electric energy generated by the electric generator 14. The control device 26 is supplied with input signals from various detecting or sensing means. These input signals include signals indicative of a torque $T_E$ of the engine 12, a torque $T_M$ of the electric motor 14, an amount of operation $\theta_A$ of an accelerator pedal, a speed $N_E$ of the engine 12, a speed $N_M$ of the motor 14, an output speed $N_O$ of the transmission 16, and an amount of electric energy SOC stored in the storage device 22.

The control device 26 is adapted to receive also a POWER DRIVE SELECT signal SP generated from a POWER DRIVE selector switch 28 provided on an instrument panel or a shift lever of the vehicle or in its vicinity. The control device 26 is also adapted to apply a POWER DRIVE MODE OFF signal SD to a POWER DRIVE MODE OFF indicator 30 provided on the instrument panel, for instance. The POWER DRIVE selector switch 28 is turned ON by the vehicle operator if the vehicle operator desires to place the control device 26 in a POWER DRIVE state in which the ENGINE·MOTOR DRIVE mode can be established as a POWER DRIVE mode,,when the appropriate condition is satisfied as described below. The POWER DRIVE selector switch 28 may be incorporated in a shift pattern selector switch which is provided to select a desired one of a plurality of different shift patterns of the transmission 16 which correspond to respective different vehicle driving modes such as an economical running mode and a powerful running mode. In this case, the POWER DRIVE state is established when the shift pattern for the powerful running mode is selected.

It will be understood that the POWER DRIVE selector switch 28 serves as power drive selecting means for selecting or establishing the POWER DRIVE state. The POWER DRIVE MODE OFF indicator 30 serves as indicating means for indicating that the POWER DRIVE mode, that is, the ENGINE·MOTOR DRIVE mode is not available.

Figure 3:
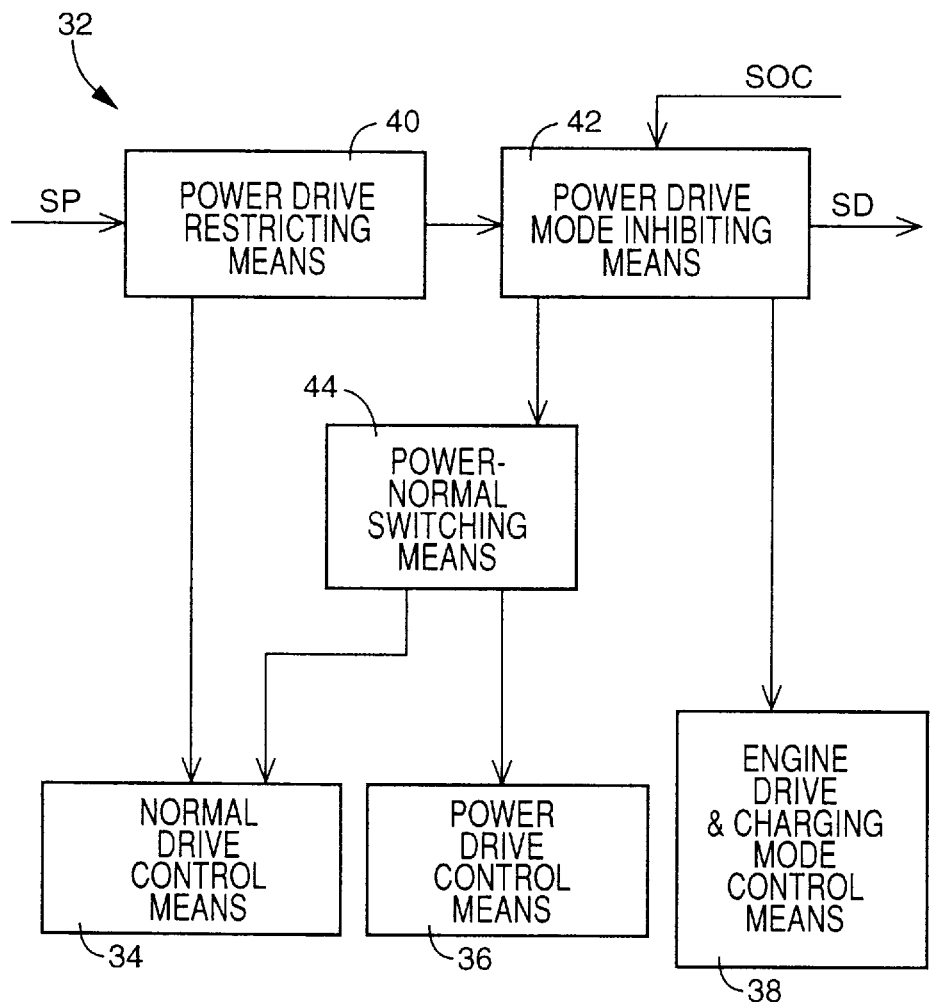
FIG. 3 is a block diagram illustrating some of the functions achieved by a control device in the hybrid drive system of FIG. 1.

The block diagram of FIG. 3 shows an arrangement of drive mode selecting means 32 of the control device 26, which is adapted to select the appropriate drive mode depending upon the specific condition of the vehicle. The drive mode selecting means 32 includes normal drive control means 34, power drive control means 36, and engine drive & charging mode control means 38. The normal drive control means 34 is adapted to establish a NORMAL drive state in which the ENGINE DRIVE and MOTOR DRIVE modes are available but the ENGINE·MOTOR DRIVE mode (POWER DRIVE mode)is not available. The power drive control means 36 is adapted to establish the POWER DRIVE state in which the ENGINE·MOTOR DRIVE is available. The engine drive & charging mode control means 38 is adapted to establish the ENGINE DRIVE & CHARGING mode in which the vehicle is driven by the engine with the electric motor being operated by the engine to charge the electric energy storage device 22. As described below, this ENGINE DRIVE & CHARGING mode may be established in the NORMAL DRIVE state and the POWER DRIVE state.

The drive mode selecting means 32 further includes power drive restricting means 40, power drive mode inhibiting means 42 and power-normal switching means 44. The power drive restricting means 40 is adapted to receive the POWER DRIVE SELECT signal SP from the POWER DRIVE selector switch 28. The power drive restricting means 40 permits the power drive control means 36 to establish the POWER DRIVE state when the POWER DRIVE SELECT signal SP is present. If the POWER DRIVE SELECT signal SP is absent, on the other hand, the the power drive restricting means 40 inhibits the power drive control means 36 from establishing the POWER DRIVE state and commands the normal drive control means 34 to establish the NORMAL DRIVE state. The power drive mode inhibiting means 42 permits the power drive control means 36 to establish the ENGINE·MOTOR DRIVE mode as the POWER DRIVE mode when the amount of electric energy SOC stored in the storage device 22 is not smaller than a lower limit A, but inhibits the power drive control means 36 from establishing the POWER DRIVE mode when the electric energy amount SOC is smaller than the lower limit A. In this latter case, the power drive mode inhibiting means commands the engine drive & charging mode control means 38 to establish the ENGINE DRIVE & CHARGING mode and apply the POWER DRIVE MODE OFF signal SD to the POWER DRIVE MODE OFF indicator 30. The POWER DRIVE MODE OFF signal SD causes the indicator 30 to provide a visual indication that the POWER DRIVE mode (i.e., ENGINE·MOTOR DRIVE mode) is not available. The lower limit A is the minimum amount of electric energy stored in the storage device 22, which is required to drive the vehicle by the electric motor 14 as the drive power source, without excessive deterioration of the charging and discharging efficiencies of the storage device 22.

Figure 4:
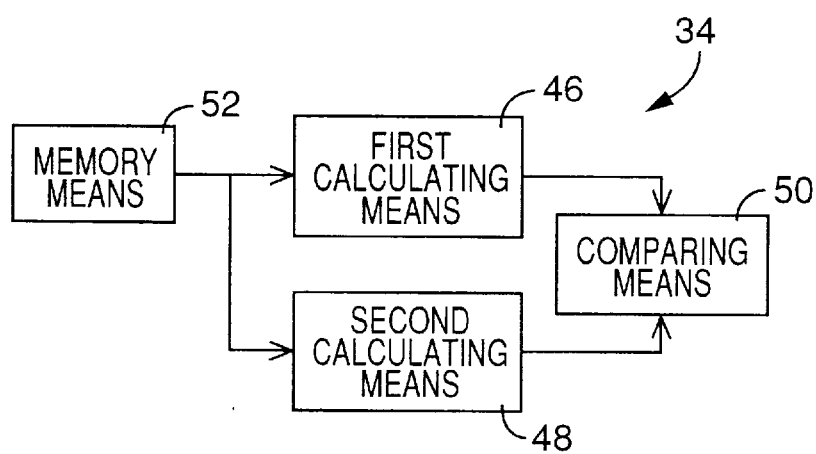
FIG. 4 is a block diagram illustrating an arrangement of normal drive control means of the control device.

The power-normal switching means 44 is adapted to select the ENGINE·MOTOR DRIVE mode in the POWER DRIVE state, or the ENGINE DRIVE mode or MOTOR DRIVE mode in the NORMAL DRIVE state, depending upon whether a predetermined running condition of the vehicle is satisfied or not. Described more specifically, the power-normal switching means 44 commands the power drive control means 36 to establish the ENGINE≦MOTOR DRIVE mode (POWER DRIVE mode) when instantaneous drive power $P_L$ required to drive the vehicle is not smaller than a predetermined threshold B, and commands the normal drive control means 34 to establish the NORMAL DRIVE state when the required instantaneous drive power $P_L$ is smaller than the threshold. The threshold B is the higher one of the maximum steady power of the engine 12 and the maximum steady power of the electric motor 14. In the present embodiment, the maximum steady power of the engine 12 is higher than that of the electric motor 14, and the threshold B is set at the maximum steady power of the engine 12. The required instantaneous drive power $P_L$ includes components for overcoming an air resistance of the vehicle and a rolling resistance of the tires of the vehicle wheels. The required instantaneous drive power $P_L$ may be determined on the basis of the engine speed $N_E$ and engine torque $T_E$, or the motor speed $N_M$ and motor torque $T_M$, or the amount or rate of change of the amount of operation $\theta_A$ of the accelerator pedal, and according to a predetermined relationship between the required instantaneous drive power $P_L$ and the parameters indicated above. This relationship is represented by a data map stored in memory means 52 (FIG. 4). Other data necessary to calculate the required drive power $P_L$ are also stored in the memory means 52.

The normal drive control means 34 is arranged as illustrated in the block diagram of FIG. 4. That is, the normal drive control means 34 includes first calculating means 46 for calculating a fuel consumption amount Mfce of the engine 12 when the engine 12 is used as the drive power source for driving the vehicle. This fuel consumption amount Mfce is calculated according to the following equation (1):

$$Mfce = FCe \times P_L \quad (1)$$

The normal drive control means 34 further includes second calculating means 48 for calculating a fuel consumption amount Mfcm of the engine 12 when the engine 12 is operated to drive the electric motor 14 for charging the electric energy storage device 22. This fuel consumption amount Mfcm is calculated according to the following equation (2):

$$Mfcm = FCm \times P_L / (\eta_{GEN} \times \eta_{BIN} \times \eta_{BOUT} \times \eta_{MOT}) \quad (2)$$

The normal drive control means 34 further includes comparing means 50 for comparing the calculated fuel consumption amounts Mfce and Mfcm, for selecting the ENGINE DRIVE state or the MOTOR DRIVE state.

Figure 7:
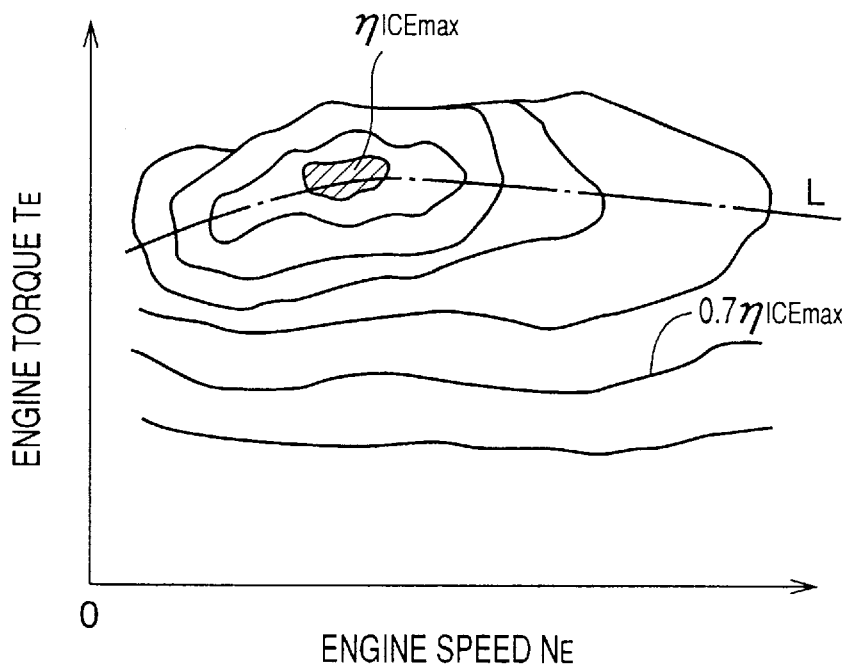
FIG. 7 is a graph showing an example of data map indicating the fuel consumption efficiency of an internal combustion engine used in the hybrid drive system of FIG. 1.

FCe in the above equation (1) represents a fuel consumption rate (g/kWh) of the internal combustion engine 12 when the required instantaneous drive power $P_L$ is provided by the engine 12. This fuel consumption rate FCe may be determined on the basis of the engine torque $T_E$ and speed $N_E$, and according to a predetermined relationship between the fuel consumption rate FCe and these parameters, which relationship is represented by a data map also stored in the memory means 52. The graph of FIG. 7 shows an iso-fuel consumption rate of the engine 12. In the graph, a hatched area indicates the lowest value of the fuel consumption rate FCe at which the power per unit fuel amount is the highest. The fuel consumption rate FCe increases from the hatched area in the outward direction away from the hatched area. Since the required instantaneous drive power $p_L$ is represented by the engine speed $N_E$ and torque $T_E$, the fuel consumption rate FCe may be obtained from the data map of FIG. 7, depending upon the required instantaneous drive power $P_L$. Data necessary to calculate the fuel consumption rate FCe are also stored in the memory means 52.

$\eta_{ICEmax}$ in the graph of FIG. 7 represents a maximum value of the fuel consumption efficiency $\eta_{ICE}$ (reciprocal of the fuel consumption rate FCe). The fuel consumption efficiency $\eta_{ICE}$ decreases from the hatched area in the outward direction away from the hatched area. The fuel consumption efficiency $\eta_{ICE}$ may be set with the maximum value $\eta_{ICEmax}$ being equal to "1".

FCm in the above equation (2) represents the fuel consumption rate of the engine 12 when the motor 14 is driven by the engine 12 to charge the electric energy storage device 22, while $\eta_{GEN}$, $\eta_{BIN}$, $\eta_{BOUT}$ and $\eta_{MOT}$ represent the following:

$\eta_{GEN}$: electricity generating efficiency, i.e., efficiency of conversion from kinetic energy into electric energy by the motor 14 (functioning as the electric generator)

$\eta_{BIN}$: charging efficiency, i.e., energy conversion efficiency upon charging of the electric energy storage device 22

$\eta_{BOUT}$: discharging efficiency, i.e., energy conversion efficiency upon consumption of the electric energy stored in the storage device 22

$\eta_{MOT}$: motor driving efficiency, i.e., efficiency of conversion from electric energy into kinetic energy by the motor 14

Figure 8:
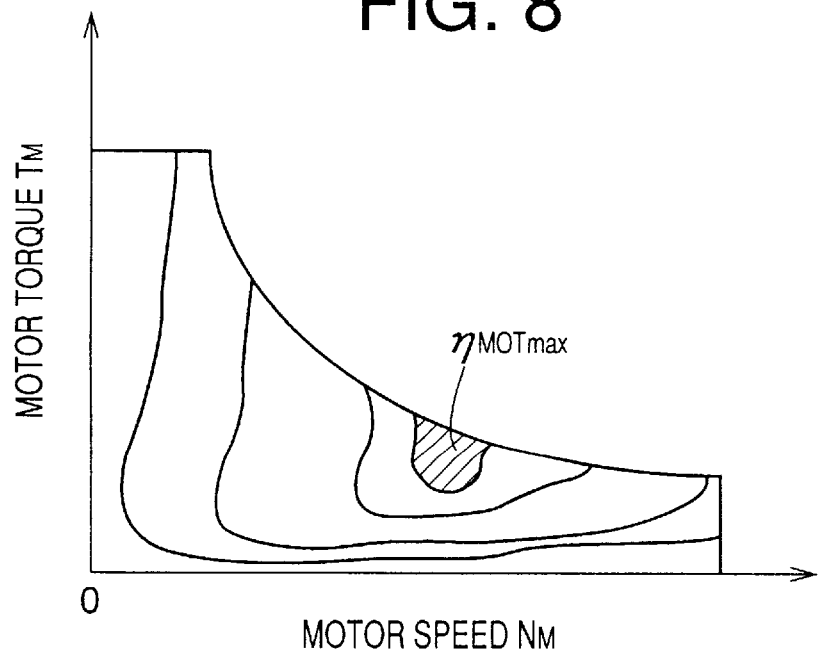
FIG. 8 is a graph showing an example of data map indicating the energy conversion efficiency of an electric motor used in the hybrid drive system of FIG. 1.

The motor driving efficiency $\eta_{MOT}$ may be represented by the motor torque $T_M$ and speed $N_M$, and may be obtained depending upon the operating condition of the motor 14, namely, depending upon the required instantaneous drive power $P_L$. The graph of FIG. 8 shows an iso-motor driving efficiency. In the graph, a hatched area indicates the highest value $\eta_{MOTmax}$ of the motor driving efficiency $\eta_{MOT}$ at which the power per unit electric energy is the highest. The motor driving efficiency $\eta_{MOT}$ decreases from the hatched area in the outward direction away from the hatched area. Since the required instantaneous drive power $P_L$ is represented by the motor speed $N_M$ and torque $T_M$, the motor driving efficiency $\eta_{MOT}$ may be obtained from the data map of FIG. 8, depending upon the required instantaneous drive power $P_L$. The discharging efficiency $\eta_{BOUT}$ may be represented by the charging amount SOC of the electric energy storage device 22 and the amount of electric energy to be supplied from the storage device 22 per unit time (electric power). The signal indicative of the charging amount SOC is received from the storage device 22, and the amount of electric energy to be supplied per unit time corresponds to the required instantaneous drive power $P_L$. Therefore, the discharging efficiency $\eta_{BOUT}$ may be obtained on the basis of the charging amount SOC and the required instantaneous drive power $P_L$ and according to a predetermined relationship between the efficiency $\eta_{BOUT}$ and these values SOC and $P_L$. This relationship is represented by a data map stored in the memory means 52. Other data (such as equations) necessary to calculate the motor driving efficiency $\eta_{MOT}$ and the discharging efficiency $\eta_{BOUT}$ are also stored in the memory means 52.

On the other hand, the fuel consumption rate FCm, electricity generating efficiency $\eta_{GEN}$ and charging efficiency $\eta_{BIN}$ are estimated when the motor 14 is driven by the engine 12 to charge the electric energy storage device 22. The thus estimated values Fce, $\eta_{GEN}$ and $\eta_{BIN}$ are independent or irrespective of the current running condition of the vehicle. The ENGINE DRIVE & CHARGING mode is selected when the charging amount SOC of the electric energy storage device 22 is smaller than the predetermined lower limit A, as described below by reference to the flow chart of FIG. 5. To calculate the fuel consumption amount Mfcm in step S9 of the flow chart of FIG. 5, average values (e.g., moving averages) of FCm, $\eta_{GEN}$, $\eta_{BIN}$ in previous vehicle runs in the ENGINE DRIVE & CHARGING mode, or values of FCm, $\eta_{GEN}$, $\eta_{BIN}$ in the last vehicle run in the ENGINE DRIVE & CHARGING mode are stored in the memory means 52. The fuel consumption amount Mfcm is calculated on the basis of those values of FCm, $\eta_{GEN}$, $\eta_{BIN}$ stored in the memory means 52 as well as the currently obtained $\eta_{BOUT}$ and $\eta_{MOT}$. In the ENGINE DRIVE & CHARGING mode, the values FCm, $\eta_{GEN}$ and $\eta_{BIN}$ are obtained as described below.

Like the fuel consumption rate FCe, the fuel consumption rate FCm may be obtained on the basis of the engine torque $T_E$ and speed $N_E$ and according to a predetermined relationship between the rate FCm and these values $T_E$, $N_E$, which relationship is represented by a stored data map. The electricity generating efficiency $\eta_{GEN}$ may be obtained on the basis of the regenerative braking torque and the motor speed $N_M$ and according to a predetermined relationship between the efficiency $\eta_{GEN}$ and these values, which relationship is represented by a stored data map. The charging efficiency $\eta_{BIN}$ may be obtained on the basis of the charging amount SOC and the amount of electric energy to be stored in the storage device 22 per unit time (electric power) and according to a predetermined relationship between the efficiency $\eta_{BIN}$ and these values, which relationship is represented by a stored data map. The amount of electric energy to be stored per unit time corresponds to surplus power that is consumed by the engine 12 for the purpose of driving the electric motor 14 for charging the storage device 22. The data maps and equations necessary for calculating the electricity generating efficiency $\eta_{GEN}$ and charging efficiency $\eta_{BIN}$ are stored in the memory means 52.

Referring next to the flow chart of FIG. 5, there will be described an operation of the control device 26, by way of example.

Figure 5:
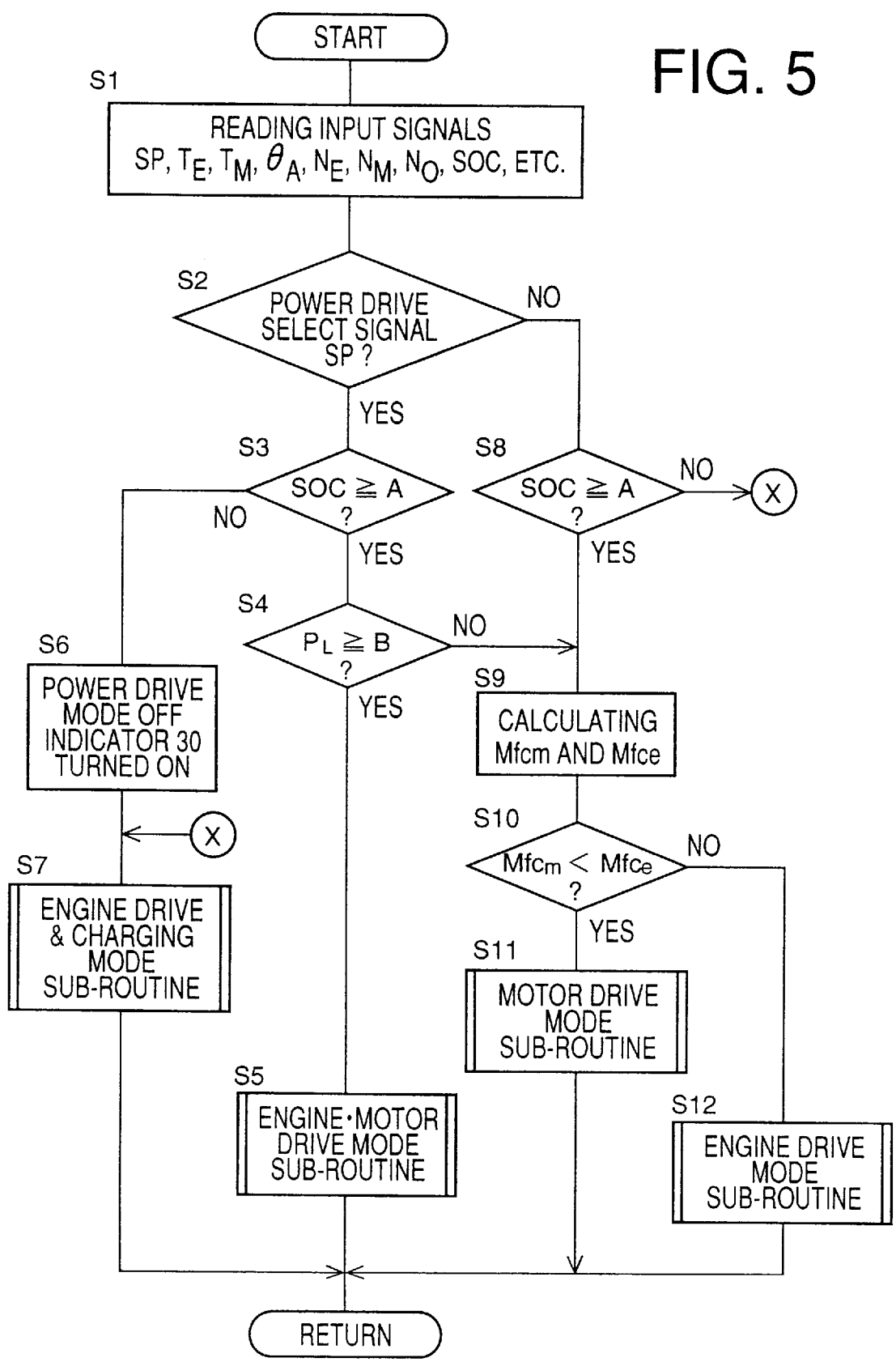
FIG. 5 is a flow chart showing a routine executed by the control device for running the vehicle in a selected one of four modes in the hybrid drive system of FIG. 1.

The routine of FIG. 5 is executed with a predetermined cycle time, and is initiated with step S1 in which the control device 26 reads the POWER DRIVE SELECT signal SP, and other input signals indicative of the engine torque $T_E$, motor torque $T_M$, operation amount $\theta_A$ of the accelerator pedal, engine speed $N_E$, motor speed $N_M$, output speed $N_O$ of the transmission 16 and electric energy amount SOC stored in the storage device 22. Step S1 is followed by step S2 to determine whether the POWER DRIVE SELECT signal SP is present or not, namely, whether the POWER DRIVE selector switch 28 is ON. Step S2 is implemented by the power drive restricting means 40. If the signal SP is present, that is, if an affirmative decision (YES) is obtained in step S2, the control flow goes to step S3 and the following steps. if the signal SP is not present, that is, if a negative decision (NO) is obtained in step S2, the control flow goes to step S8 and the following steps.

Steps S8–S12 are implemented by the normal drive control means 34. That is, the normal drive control means 34 initially implements step s8 to determine whether the amount of electric energy SOC stored in the storage device 22 is equal to or larger than the predetermined lower limit A. As described above, the lower limit A is the minimum amount of electric energy required to operate the electric motor 14 as the drive power source without excessive deterioration of the charging and discharging efficiency of the storage device 22. If the stored electric energy amount SOC is equal to or larger than the lower limit A, that is, if an affirmative decision (YES) is obtained in step S8, the control flow goes to step S9. If the electric energy amount SOC is smaller than the lower limit A, namely, if a negative decision (NO) is obtained in step S8, the control flow goes to step S7 in which an ENGINE DRIVE & CHARGING MODE sub-routine is executed. Step S9 is implemented by the first calculating means 46 and the second calculating means 48 of the normal drive control means 34. In this step S9, the fuel consumption amounts Mfce and Mfcm are calculated by the calculating means 46, 48, respectively, according to the above equations (1) and (2), respectively. Step S9 is followed by step S10 which is implemented by the comparing means 50, to compare the calculated fuel consumption amounts Mfce, Mfcm with each other. If the fuel consumption amount Mfcm is smaller than the fuel consumption amount Mfce, the control flow goes to step S11 to implement the MOTOR DRIVE MODE sub-routine for establishing the MOTOR DRIVE mode in which the electric motor 14 is operated as the drive power source to drive the vehicle. If the fuel consumption amount Mfcm is equal to or larger than the fuel consumption amount Mfce, the control flow goes to step S12 to implement the ENGINE DRIVE MODE sub-routine for establishing the ENGINE DRIVE mode in which the engine 12 is operated as the drive power source to drive the vehicle. Thus, the engine 12 and the electric motor 14 are selectively used as the drive power source so as to minimize the fuel consumption amount Mfc.

If an affirmative decision (YES) is obtained in step S2, that is, if the POWER DRIVE SELECT signal SP is present, the control flow goes to step S3 to determine whether the electric energy amount SOC stored in the storage device 22 is equal to or larger than the lower limit A. In this case, the step S2 is implemented by the power drive inhibiting means 42. If the electric energy amount SOC is equal to or larger than the lower limit A, the control flow goes to step S4 and the following step. If the electric energy amount SOC is smaller than the lower limit A, the control flow goes to steps S6 and S7. Step S4 is implemented by the power-normal switching means 44, to determine whether the required instantaneous drive power $P_L$ is equal or larger than the threshold B. If an affirmative decision (YES) is obtained in step S4, the control flow goes to step S5 to implement the ENGINE·MOTOR DRIVE MODE sub-routine. If a negative decision (NO) is obtained in step S4, the control; flow goes to step S9 and the following steps described above. The ENGINE·MOTOR DRIVE MODE sub-routine in step S5 is implemented by the power drive control means 36, to establish the POWER DRIVE mode, that is, the ENGINE·MOTOR DRIVE mode in which the engine 12 is operated so as to produce its maximum output while the electric motor 14 is operated so as to provide an output so that the sum of the output of the engine 12 and the output of the electric motor 14 is equal to the required instantaneous drive power $P_L$.

If a negative decision (NO) is obtained in step S3, that is, if the stored electric energy amount SOC is smaller than the lower limit A, the control flow goes to step S6 which is implemented by the power drive inhibiting means 42, to apply the POWER DRIVE MODE OFF signal to the POWER DRIVE MODE OFF indicator 30 so that the indicator 30 provides a visual indication that the POWER DRIVE mode is not established, namely, the ENGINE·MOTOR DRIVE mode is not available in the present condition of the vehicle. Step S6 is followed by step S7 to implement an ENGINE DRIVE & CHARGING MODE sub-routine for establishing the ENGINE DRIVE & CHARGING mode in which the engine 12 is operated to drive the vehicle while driving the electric motor 14 to charge the electric energy storage device 22, as illustrated in the flow chart of FIG. 6, by way of example only.

Figure 6:
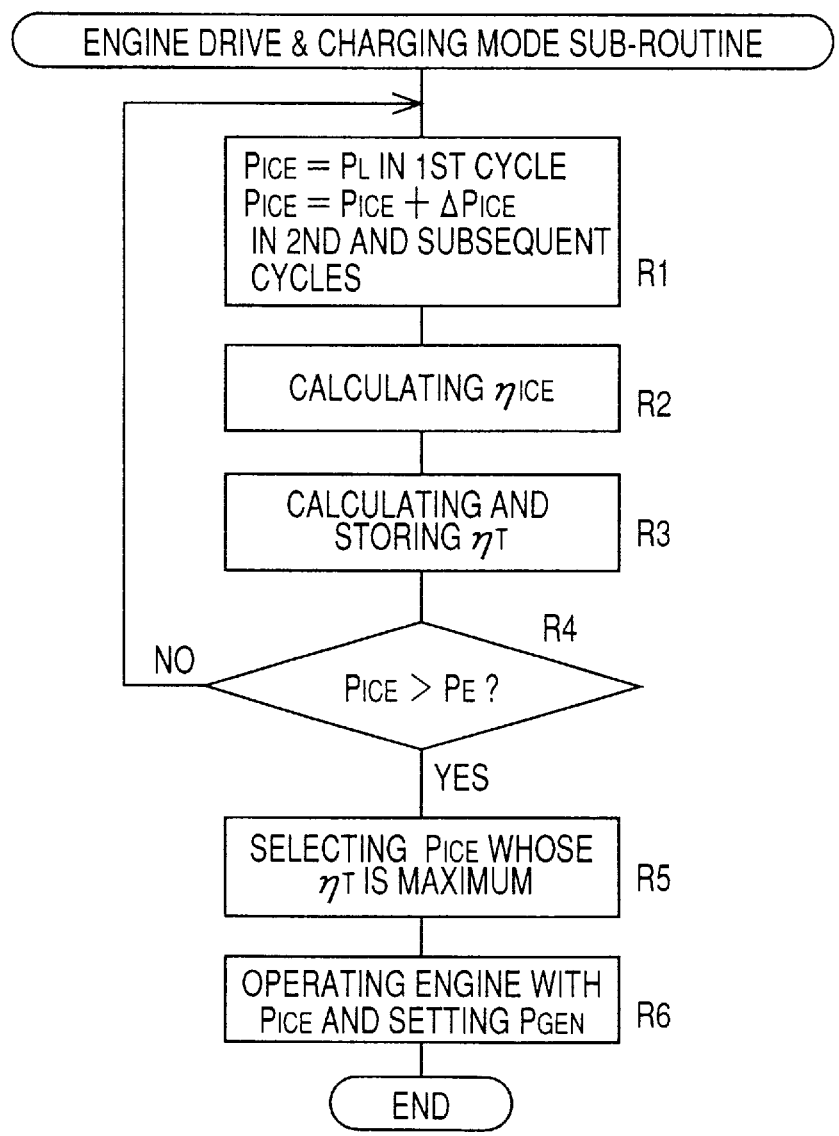
FIG. 6 is a flow chart for explaining an ENGINE DRIVE & CHARGING MODE sub-routine executed in step S7 of the routine of FIG. 5.
Figure 9:
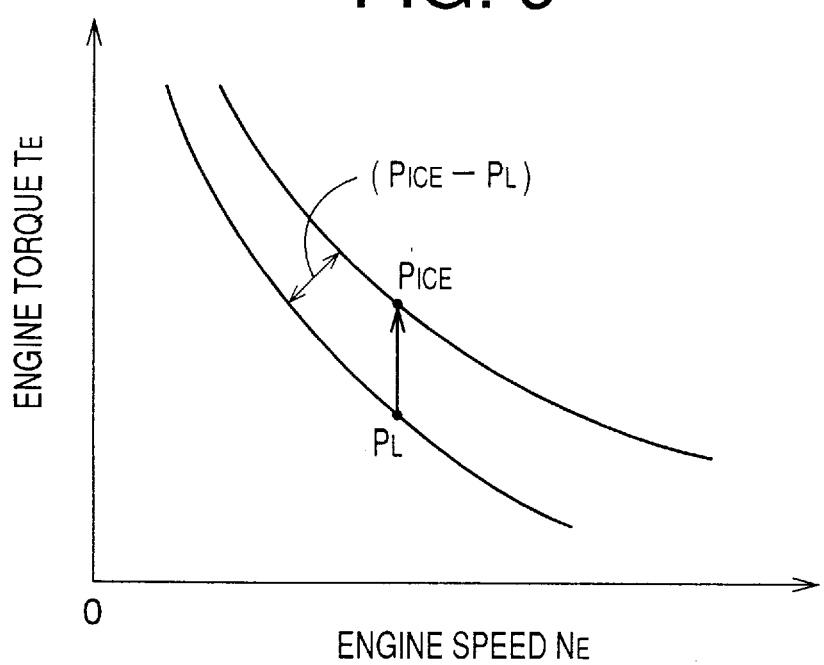
FIG. 9 is a graph indicating a relationship between engine output $P_{ICE}$ and surplus power ($P_{ICE}-P_L$) used in the sub-routine of FIG. 6.

The ENGINE DRIVE & CHARGING MODE sub-routine of FIG. 6 is initiated with step R1 in which a candidate value of an output or power $P_{ICE}$ of the engine 12 is determined to be equal to the required instantaneous drive power $P_L$, in the first cycle of execution of the sub-routine, that is, when the sub-routine is executed for the first time. In the second and subsequent cycles of execution of the sub-routine of FIG. 6, the candidate value of the engine output $P_{ICE}$ is incremented by a predetermined increment amount $\Delta P_{ICE}$ in step R1. Since the engine speed $N_E$ is held constant at a level depending upon the vehicle running speed, the engine torque $T_E$ increases by an amount corresponding to the increment amount $\Delta P_{ICE}$ as indicated in FIG. 9. Therefore, the surplus torque value of the engine 12 is obtained as a sum of the increment amounts $\Delta P_{ICE}$ in repeated implementation of step R1, that is, as a difference ($P_{ICE}-P_L$) between the candidate value of the engine output $P_{ICE}$ and the required instantaneous drive power $P_L$. The graph of FIG. 9 shows iso-drive power lines of the engine 12, which indicate that the engine torque $T_E$ for obtaining the same drive power changes with the engine speed $N_E$. The engine output $P_{ICE}$ and the required instantaneous drive power $P_L$ are determined by the specific combination of the current engine speed $N_E$ and torque $T_E$. Although the increment amount $\Delta P_{ICE}$ is a predetermined fixed value in the present embodiment, the increment amount $\Delta P_{ICE}$ may be changed depending upon the running condition of the vehicle, for example, depending upon the required instantaneous drive power $P_L$. The engine torque $T_E$ rather than the engine output $P_{ICE}$ may be changed by a predetermined increment.

Step R1 is followed by step R2 to calculate the fuel consumption rate $\eta_{ICE}$ on the basis of the engine output $P_{ICE}$ and according to the stored predetermined relationship between $\eta_{ICE}$ and $P_{ICE}$ as shown in FIG. 9. Then, the control flow goes to step R3 to calculate an overall fuel consumption efficiency $\eta_T$ of a system which is assigned to charge the electric energy storage device 22 by operation of the electric motor 14 by the surplus power ($P_{ICE}-P_L$) of the engine 12. The calculation of the overall fuel consumption efficiency $\eta_T$ is effected according to the following equation (3), and the calculated overall consumption efficiency $\eta_T$ is stored in the memory means 52.

$$\eta_T = \eta_{GEN} \times \eta_{BIN} \times \eta_{MOT} \times \eta_{ICE} + (P_L/P_{ICE}) \times \eta_{ICE} \times (1-\eta_{GEN} \times \eta_{BIN} \times \eta_{BOUT} \times \eta_{MOT}) \quad (3)$$

The present embodiment is adapted to obtain the overall fuel consumption efficiency $\eta_T$ as a ratio of the fuel consumption amount Mfc to the output or power of the electric motor 14 when the motor 14 is driven by the electric energy which has been stored in the electric energy storage device 22 by operation of the motor 14 by the surplus power ($P_{ICE}-P_L$) of the engine 12.

The electricity generating efficiency $\eta_{GEN}$ used in the above equation (3) is obtained according to the data map stored in the memory means 52, depending upon the surplus power ($P_{ICE}-P_L$), that is, depending upon the speed and surplus torque (regenerative braking torque), while the charging efficiency $\eta_{BIN}$ is obtained according to the data map also stored in the memory means 52, depending upon the surplus power ($P_{ICE}-P_L$) and the charging amount SOC. The discharging efficiency $\eta_{BOUT}$ and the motor driving efficiency $\eta_{MOT}$ used in the equation (3) are obtained in the MOTOR DRIVE mode and stored in the memory means 52. For instance, averages (e.g., moving averages) of the efficiency $\eta_{BOUT}$, $\eta_{MOT}$ in two or more previous vehicle runs in the MOTOR DRIVE mode are stored in the memory means 52. Alternatively, values of $\eta_{BOUT}$, $\eta_{MOT}$ in the last vehicle run in the MOTOR DRIVE mode are stored in the memory means 52. These values stored in the memory means 52 are used as the efficiency values $\eta_{BOUT}$ and $\eta_{MOT}$ in the equation (3) to calculate the overall fuel consumption efficiency $\eta_T$. In the MOTOR DRIVE mode, the discharging efficiency $\eta_{BOUT}$ is obtained on the basis of the required drive power $P_L$ and the charging amount SOC and according to a predetermined relationship between the efficiency $\eta_{BOUT}$ and the values $P_L$ and SOC, namely, on the basis of the motor speed $N_M$ and torque $T_M$ and according to a predetermined relationship between the efficiency $\eta_T$ and the values $N_M$, $T_M$, which relationship is represented by a data map stored in the memory means 52.

Then, the control flow goes to step R4 to determine whether the engine output $P_{ICE}$ is larger than a predetermined threshold $P_E$. Steps R1–R4 are repeatedly implemented until an affirmative decision (YES) is obtained in step R4, that is, until the engine output $P_{ICE}$ exceeds the threshold PE. While this threshold $P_E$ may be a predetermined fixed value, it may be changed depending upon the required instantaneous drive power $P_L$ and according to a predetermined relationship between the threshold $P_E$ and the power $P_L$, so as to prevent overrunning of the engine 12 and motor 14. This relationship is represented by a data map stored in the memory means 52. Steps R1 through R4 correspond to means for repeatedly calculating the overall fuel consumption efficiency values $\eta_T$ which reflect the electricity generating efficiency $\eta_{GEN}$ of the motor 14 and the charging efficiency $\eta_{BIN}$ of the electric energy storage device 22 upon charging of the device 22 by the surplus power ($P_{ICE}-P_L$), while changing the surplus power ($P_{ICE}-P_L$) or while changing the candidate value of the engine output $P_{ICE}$. As described above, the present embodiment is adapted to obtain the overall fuel consumption efficiency $\eta_T$ while taking into account the efficiency of operation of the motor 14 by the electric energy stored in the storage device 22, as well as the efficiency of charging of the storage device 22 by operation of the electric motor 14 (as the electric generator) by the surplus power ($P_{ICE}-P_L$) of the engine 12. However, the efficiency of charging of the storage device 22 may be obtained in step R3, so that the obtained charging efficiency is substituted for the overall fuel consumption efficiency $\eta_T$.

When the affirmative decision (YES) is obtained in step R4, the control flow goes to step R5 to select one of the engine output candidate values $P_{ICE}$ obtained in step R1, which corresponds to the highest overall fuel consumption efficiency value $\eta_T$. The highest overall fuel consumption efficiency value $\eta_T$ means the lowest ratio of the fuel consumption amount Mfc to the output or power of the electric motor 14 during operation of the motor 14 by the electric energy which has been stored in the electric energy storage device 22 by operation of the motor 14 by the surplus power ($P_{ICE}-P_L$). Since the discharging efficiency $\eta_{BOUT}$ and the motor driving efficiency $\eta_{MOT}$ in the above equation (3) remain unchanged with a change in the engine output $P_{ICE}$, the engine output value $P_{ICE}$ whose ratio of the fuel consumption amount Mfc to the amount of the electric energy to be stored in the storage device 22 is the lowest is selected in step R5. then, the control flow goes to step R6 wherein the engine 12 is operated so as to provide the selected engine output $P_{ICE}$, and electricity generating power $P_{GEN}$ given to the electric motor 14 to charge the storage device 22 is determined to be equal to the surplus power ($P_{ICE}-P_L$). In the ENGINE DRIVE & CHARGING mode, therefore, the vehicle is run by the engine 12 as the drive power source while the electric motor 14 is operated as the electric generator by the engine 12 to charge the electric energy storage device 22, so as to minimize the ratio of the fuel consumption amount Mfc to the electric energy to be stored.

It is noted that the ENGINE DRIVE & CHARGING MODE sub-routine in step S7 is formulated such that when the required instantaneous drive power $P_L$ of the engine 12 is larger than its maximum output, the engine 12 is operated to produce its maximum output for driving the vehicle, without operating the electric motor 14 to charge the storage device 22. In the NORMAL DRIVE state established in step S9 and the following steps, the ENGINE DRIVE MODE sub-routine in step S12 is implemented when the required instantaneous drive power $P_L$ is comparatively large. In this case, too, the engine 12 is operated to provide its maximum output when the required instantaneous drive power $P_L$ is larger than its maximum output.

In the present hybrid drive system 10, the POWER DRIVE state is not established, and the ENGINE·MOTOR drive mode (ENGINE·MOTOR DRIVE mode) is unavailable, unless the POWER DRIVE selector switch 28 is turned ON. In other words, when the selector switch 28 is OFF, the vehicle is run in the NORMAL DRIVE state in which the ENGINE DRIVE MODE sub-routine or the MOTOR DRIVE MODE sub-routine is selectively implemented to drive the vehicle by either the engine 12 or the electric motor 14 as the drive power source. When the POWER DRIVE selector switch 28 is OFF, the vehicle operator recognizes that the ENGINE·MOTOR DRIVE mode is unavailable and that the vehicle drive force in the NORMAL DRIVE state may be smaller than expected. It is further noted that when the electric energy amount SOC stored in the storage device 22 is reduced below the lower limit A during running of the vehicle in the POWER DRIVE state, the ENGINE·MOTOR DRIVE mode is inhibited, and the ENGINE DRIVE & CHARGING MODE sub-routine is implemented in step S7, so that the engine 12 is operated as the drive power source for driving the vehicle with its maximum output, in accordance with the vehicle operator's desire to drive the vehicle in the POWER DRIVE state selected by the POWER DRIVE selector switch 28. Thus, the present hybrid drive system 10 does not suffer from the conventionally encountered drawback that the vehicle drive force as felt by the vehicle operator in the POWER DRIVE state is insufficient.

When the electric energy amount SOC stored in the storage device 22 falls below the lower limit A, that is, when the negative decision (NO) is obtained in step S3, the control flow does not go to step S5, namely, the control device 26 cannot be placed in the ENGINE·MOTOR DRIVE mode (POWER DRIVE mode) even while the POWER DRIVE selector switch 28 is ON. This arrangement is effective to prevent excessive discharging of the storage device 22 (excessive reduction of the stored electric energy amount SOC), which may result in damage and excessive deterioration of the charging and discharging efficiencies $\eta_{BIN}$, $\eta_{BOUT}$ of the storage device 22. It is also noted that the provision of the POWER DRIVE MODE OFF indicator 30 permits the vehicle operator to recognize that the ENGINE·MOTOR DRIVE mode is unavailable even with the selector switch 28 being ON, and understand that the vehicle drive force is produced by only the engine 12 while the electric motor 14 does not contributes to the drive force.

In the present hybrid drive system 10, the power transmission efficiency of the transmission 16 is not taken into account for obtaining the fuel consumption amounts Mfce and Mfcm and the overall fuel consumption efficiency $\eta_T$. Where the transmission 16 is capable of changing the speed ratio in steps or continuously, however, the power transmission efficiency of the transmission 16 varies with the speed ratio, and the fuel consumption amounts Mfce and Mfcm and the overall fuel consumption efficiency $\eta_T$ vary with the speed ratio and power transmission efficiency of the transmission 16. In the light of this fact, it is desirable to obtain those values Mfce, Mfcm and $\eta_T$ according to the following equations (4), (5) and (6), which include power transmission efficiency $\eta_{CVT}$ of the transmission 16 where it is a continuously variable transmission. The power transmission efficiency $\eta_{CVT}$ is obtained on the basis of appropriate parameters such as the speed ratio, transmission torque and input and output speeds of the transmission 16, and according to a predetermined relationship of the efficiency $\eta_{CVT}$ and those parameters, which relationship is represented by a data map stored in the memory means 52, together with other data (e.g., equations) necessary to calculate the power transmission efficiency $\eta_{CVT}$.

$$Mfce = Fce \times P_L / \eta_{CVT} \tag{4}$$

$$Mfcm = Fcm \times P_L / (\eta_{GEN} \times \eta_{BIN} \times \eta_{BOUT} \times \eta_{MOT} \times \eta_{CVT}) \tag{5}$$

$$\eta_T = \eta_{GEN} \times \eta_{BIN} \times \eta_{BOUT} \times \eta_{MOT} \times \tag{6}$$

$$\eta_{CVT}^* \times \eta_{ICE} + (P_L/P_{ICE}) \times hICE \times$$

$$\{1 - (\eta_{GEN} \times \eta_{BIN} \times \eta_{BOUT} \times \eta_{MOT} \times \eta_{CVT}^*)/\eta_{CVT}\}$$

As described above, the power transmission efficiency $\eta_{CVT}$ in the above equations (4), (5) and (6) is obtained on the basis of the current running condition of the vehicle such as the transmission torque and speed ratio of the transmission 16 which correspond to the required instantaneous drive power $P_L$, and according to the data map stored in the memory means 52. Like the discharging efficiency $\eta_{BOUT}$ and the motor driving efficiency $\eta_{MOT}$, the power transmission efficiency $\eta_{CVT}^*$ in the above equation (6) is an average (e.g., moving average) of the values stored in the memory means 52 in the previous vehicle runs in the MOTOR DRIVE mode, or a value stored in the memory means 52 in the last vehicle run in the MOTOR DRIVE mode.

In the present embodiment, the ENGINE DRIVE mode or the MOTOR DRIVE mode is selected so as to reduce the fuel consumption amount Mfc, and the engine 12 is controlled in the ENGINE DRIVE & CHARGING mode so as to maximize the overall fuel consumption efficiency $\eta_T$, whereby the fuel consumption amount Mfc is minimized and the exhaust gas amount is accordingly minimized. However, the exhaust gas amount of the engine 12 can be further reduced by replacing the fuel consumption rates Fcm, Fce in the above equations (1) through (6), by an exhaust gas emission rate (amount of the exhaust gas emission per unit power), or by replacing the fuel consumption efficiency $\eta_{ICE}$ by an exhaust gas emission efficiency (reciprocal of the exhaust gas emission rate). Further, the selection of the ENGINE DRIVE mode and the MOTOR DRIVE mode and the determination of the engine output $P_{ICE}$ in the ENGINE DRIVE & CHARGING mode may be effected using physical quantities other than the fuel consumption amount Mfc and the exhaust gas amount.

In the hybrid drive system 10 according to the present embodiment of the invention, the fuel consumption amounts Mfce, Mfcm are calculated in each cycle of execution of the routine of FIG. 5 depending upon the running condition of the vehicle, such as the required instantaneous drive power $P_L$. In this connection, it is noted that the maximum energy conversion efficiencies $\eta_{GEN}$ and $\eta_{MOT}$ ($\eta_{MOTmax}$ indicated in FIG. 7) of the electric motor 14 are about 92%, while the input and output efficiency $\eta_{BIN} \times \eta_{BOUT}$ of the electric energy storage device 22 is about 85%, whereby the overall energy conversion efficiency of the electric control system is about $0.72 = 0.92 \times 0.85 \times 0.92$. In view of this fact, it is possible to select the ENGINE DRIVE mode if the fuel consumption efficiency $\eta_{ICE}$ for running the vehicle in the ENGINE DRIVE mode with the engine 12 selected as the drive power source is larger than a threshold of $0.7\eta_{ICEmax}$ indicated in FIG. 7, which threshold is 70% of the maximum fuel consumption efficiency $\eta_{ICEmax}$, and select the MOTOR DRIVE mode if the fuel consumption efficiency $\eta_{ICE}$ is smaller than the threshold of $0.7\eta_{ICEmax}$. The threshold is not limited to 70% of the maximum fuel consumption efficiency $\eta_{ICEmax}$, but may be suitably determined depending upon the energy conversion efficiencies of the electric motor 14 and the electric energy storage device 22.

In step R1 of the ENGINE DRIVE & CHARGING MODE sub-routine of FIG. 6, the engine output $P_{ICE}$ is initially set to be equal to the required drive power $P_L$, and is incremented by the predetermined amount $\Delta P_{ICE}$ each time the sub-routine is executed, so that the engine output $P_{ICE}$ whose overall fuel consumption efficiency $\eta_T$ is the highest is selected in step R5. However, the manner of determining the engine output $P_{ICE}$ so as to maximize the overall fuel consumption efficiency $\eta_T$ may be modified as needed. For instance, the engine output $P_{ICE}$ may be selected within a predetermined range along a line L representative of the minimum fuel consumption rate, which is indicated by one-dot chain line in the graph of FIG. 7. This predetermined range has a predetermined width in the direction of the engine torque $T_E$ on the upper and lower sides of the line L.

Suitable modifications may be made regarding the manner of selecting the ENGINE DRIVE mode or the MOTOR DRIVE mode in the NORMAL DRIVE state in step S8 and the following steps, and the manner of determining the engine output $P_{ICE}$ and electricity generating power $P_{GEN}$ in the ENGINE DRIVE & CHARGING MODE sub-routine in step S7.

In the routine of FIG. 5, the POWER DRIVE MODE OFF indicator 30 is not turned ON where the negative decision (NO) is obtained in step S8. However, the routine may be modified such that step S8 is followed by step S6 to turn ON the indicator 30 if the negative decision (NO) is obtained in step S8. In this case, steps 3 and S8 may be replaced by a step which is implemented prior to step S2.

Figure 10:
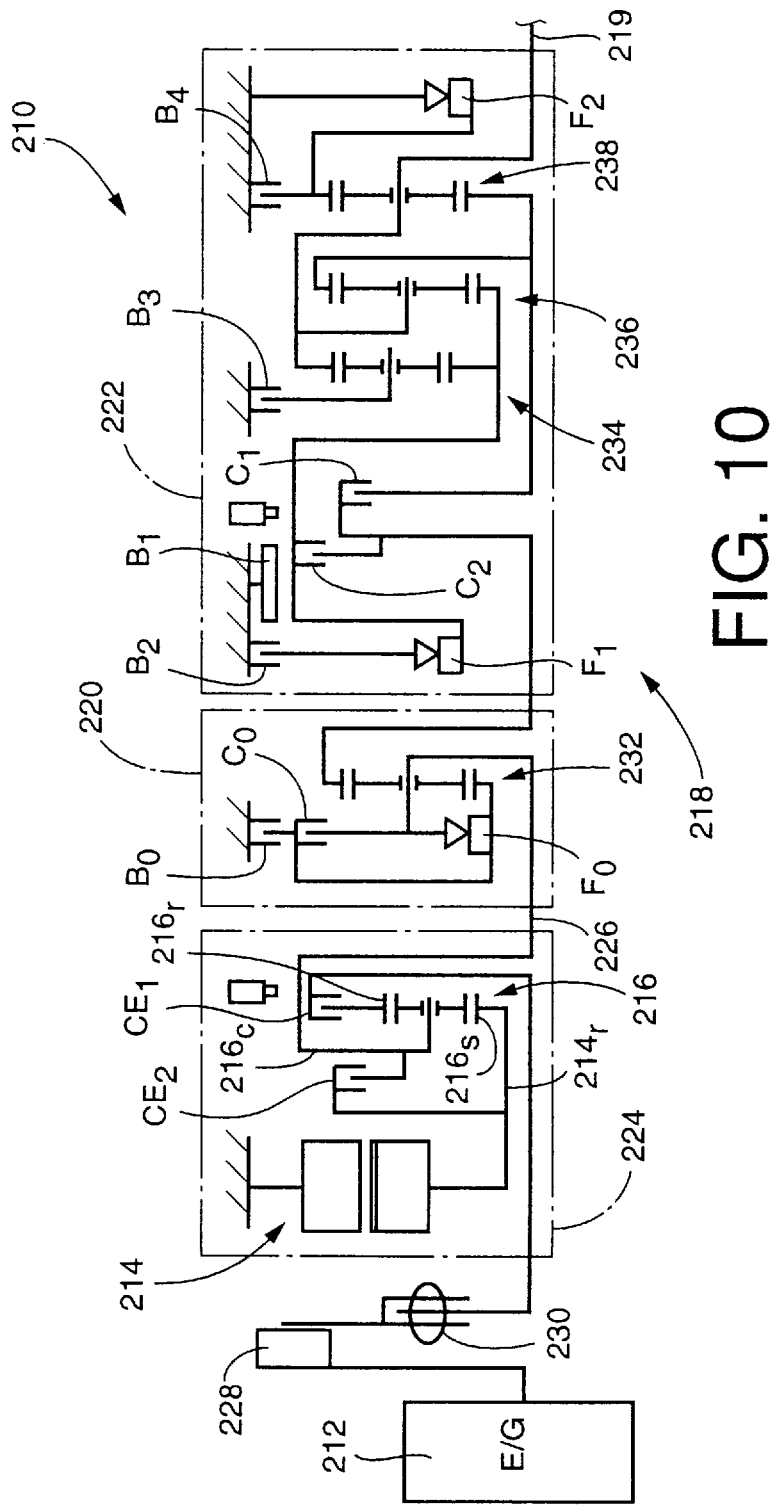
FIG. 10 is a schematic view illustrating a general arrangement of a hybrid drive system constructed according to a second embodiment of the present invention.

Referring next to the schematic view of FIG. 10, there is shown a hybrid drive system 210 adapted for use on a front-engine rear-drive motor vehicle (FR vehicle). The hybrid drive system 210 includes: an engine 212 such as an internal combustion engine, which is operated by combustion of a fuel; a motor/generator 214 which functions as an electric motor operated with an electric energy, and an electric generator; a planetary gear device 216 of single pinion type; and a power transmission device in the form of an automatic transmission 218. These engine 212, motor/generator 214, planetary gear device 216 and automatic transmission 218 are arranged in the longitudinal direction of the motor vehicle. The automatic transmission 218 has an output shaft 219 which is operatively connected to rear right and left drive wheels of the vehicle through a propeller shaft and a differential gear device (which are not shown), to transmit a drive force to the drive wheels. The planetary gear device 216 functions as a synthesizing/distributing mechanism for mechanically synthesizing and distributing a force, and cooperates with the motor/generator 214 to constitute an electrically controlled torque converter 224 as indicated in one-dot chain line in FIG. 10. The planetary gear device 216 includes: a first rotary element in the form of a ring gear 216$r$ connected to the engine 212 through a first clutch CE1; a second rotary element in the form of a sun gear 216$s$ connected to a rotor shaft 214$r$ of the motor/generator 214; and a third rotary element in the form of carrier 216$c$ connected to an output shaft, which is an input shaft 226 of the automatic transmission 218. The sun gear 216$s$ and carrier 216$c$ are connected to each other through a second clutch CE2. The engine 212 is connected to the first clutch CE1 through a flywheel 228 and a damper 230. The flywheel 228 and the damper 230 function to absorb speed and torque variations of the engine 212. The damper 230 includes an elastic member such as a spring or a rubber member. The first and second clutches CE1, CE2 are friction type multiple-disk clutches which are engaged and released by respective hydraulic actuators.

Figure 17:
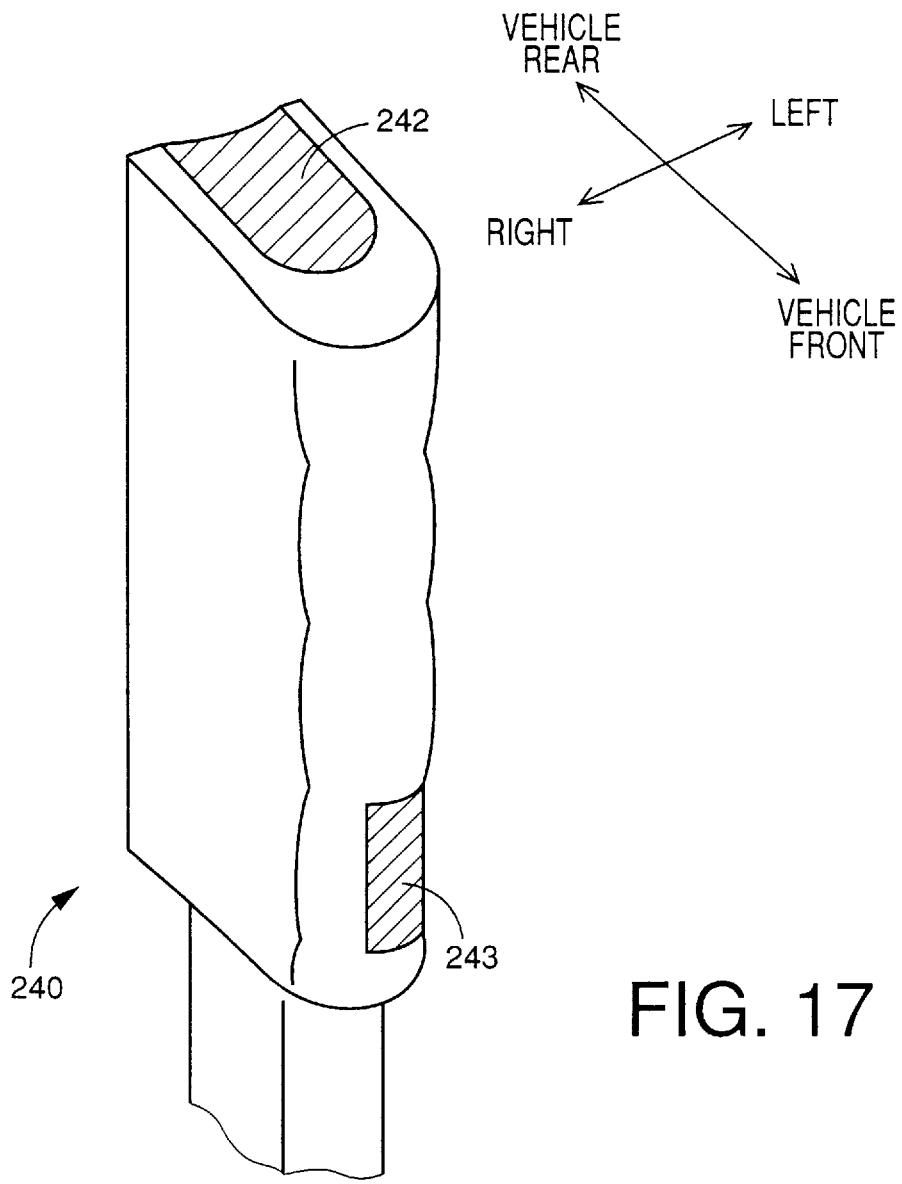
FIG. 17 is a perspective view showing a shift lever provided in the vehicle equipped with the hybrid drive system of FIG. 10.

The automatic transmission 218 is a combination of a front auxiliary transmission 220 and a rear primary transmission 222. The auxiliary transmission 220 consists of an overdrive planetary gear set 232 of single pinion type, while the primary transmission 222 consists of three planetary gear sets 234, 236, 238 connected to each other. The auxiliary transmission 220 has a low-gear position (direct drive position) and a high-gear position. The primary transmission 222 has four forward-drive positions and one rear-drive position. The auxiliary transmission 220 includes frictionally coupling clutch C0 and brake B0 operated by respective hydraulic actuators, and a one-way clutch F0. The primary transmission 222 frictionally coupling clutches C1, C2 and brakes B1, B2, B3, B4 which are operated by respective hydraulic actuators, and one-way clutches F1, F2. The automatic transmission 218 includes a hydraulic control device 244 incorporating solenoid-operated valves SL1–SL4 shown in FIG. 11. The solenoids of these solenoid-operated valves SL1–SL4 are selectively energized and deenergized to selectively engage and release the clutches C0, C1, C2 and brakes B0, B1, B2, B3, B4 for selectively establishing one of operating positions of the automatic transmission 218, as indicated in FIG. 12. The operating positions of the automatic transmission 218 consist of a neutral position "IN", a first rear-drive position "Rev 1", a second rear-drive position "Rev 2", and five forward-drive positions, that is, first-speed position "1st", second-speed position "2nd", third-speed position "3rd", fourth-speed position "4th" and fifth-speed position "5th", as indicated in FIG. 12. The hydraulic control device 244 includes a manual shift valve which is mechanically connected to and operated by a shift lever 240 as shown in FIG. 17. The clutches C0–C2 and brakes B0–B4 are controlled by the solenoid-operated valves SL1–SL4 and the manual shift valve. Since the automatic transmission 218 and the electrically controlled torque converter 224 are symmetrical with respect to their centerline, only the upper halves of the transmission 128 and torque converter 224 are shown in FIG. 10.

Figure 18:
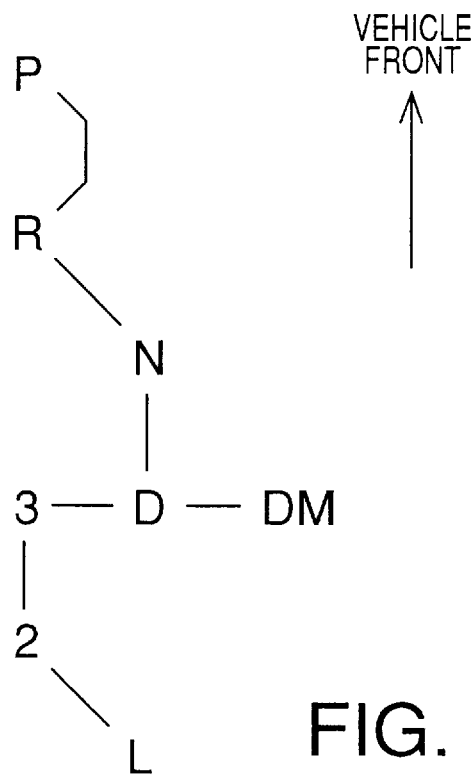
FIG. 18 is a view indicating operating positions of the shift lever of FIG. 17.

The shift lever 240 has a neutral position "N", a reverse position "R", and drive position "D", as also indicated in FIG. 12. Further, the shift lever 240 has a parking position "P", a third-speed position "3", a second-speed position "2", a low-speed position "L", and a manual-mode position "DM", as indicated in FIG. 18. Thus, the shift lever 240 has a total of eight operating positions. The third-speed, second-speed, low-speed and manual-mode positions "3", "2" and "L" and are referred to as engine braking positions in which an engine brake may be applied to the vehicle. In the manual-mode position "DM", an engine brake may be applied to the vehicle.

In the table of FIG. 12, white circles indicate the engaged states of the clutches C, brakes B and one-way clutches F, while black circles indicate the engaged states of the clutch C0 and brakes B1, B4 when the shift lever 240 is shifted to any one of the above-indicated engine braking positions. The absence of the white or black circles indicates the released states of the clutches C, brakes B and one-way clutches F. The neutral and rear-drive positions "N", "Rev 1" and "Rev 2" and the engine-braking positions of the automatic transmission 218 are established by the manual shift valve mechanically connected to the shift lever 240. When the shift lever 240 is placed in the drive position "D", the automatic transmission 18 is automatically placed in an appropriate one of the five forward-drive positions "1st" through "5th", with the solenoids of the solenoid-operated valves SL1–SL4 being selectively energized depending upon the running condition of the vehicle. The speed ratios of the five forward-drive positions of the automatic transmission 218 decrease in steps from the speed ratio of the first-speed position "1st" to the speed ratio of the fifth-speed position "5th", as indicated in FIG. 12, by way of example only.

Figure 11:
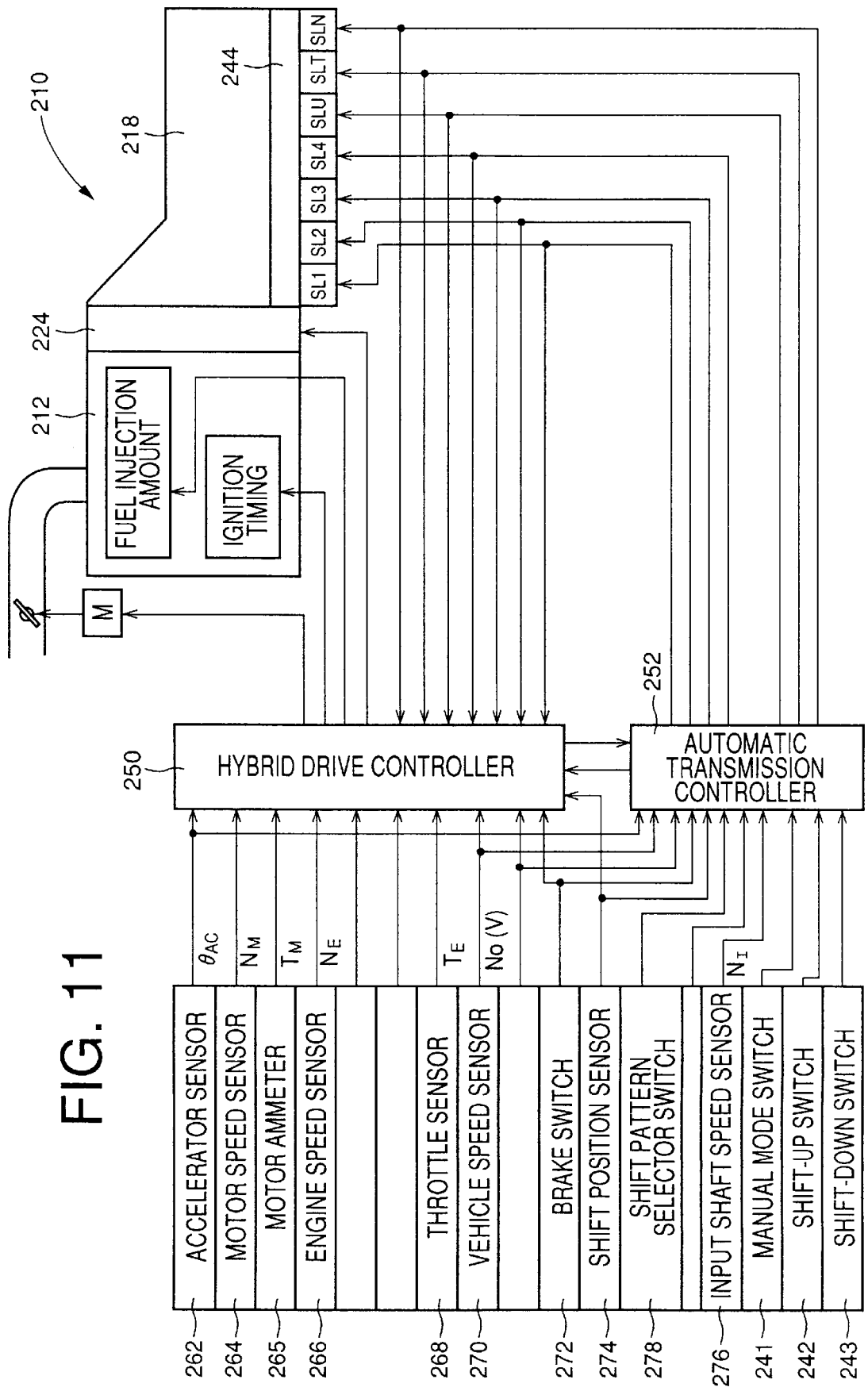
FIG. 11 is a view illustrating a control system used in the hybrid drive system of FIG. 10.
Figure 19:
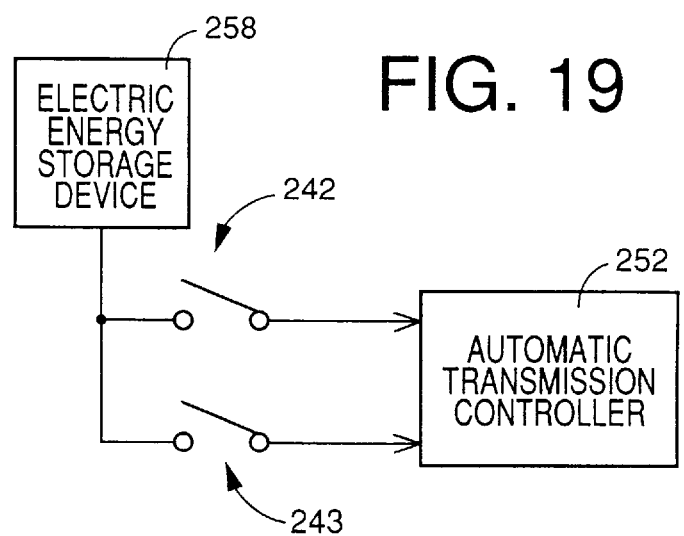
FIG. 19 is a view showing electrical connection of SHIFT-UP and SHIFT-DOWN switches on the shift lever, to an electric energy storage device and an automatic transmission controller in the hybrid drive system of FIG. 10.

The eight operating positions "P", "R", "N", "D", "3", "DM", "2" and "L" of the shift lever 240 are located as indicated in FIG. 18. The shift lever 240 has six positions in the longitudinal or running direction of the vehicle (in the vertical direction as seen in FIG. 18), and the manual shift valve has six positions corresponding to these six positions. When the shift lever 240 is placed in the manual-mode position "DM", the automatic transmission 218 can be manually shifted to a selected one of the five forward-drive positions "1st" through "5th", by operating a SHIFT-UP switch 242 and a SHIFT-DOWN switch 243. These switches 242, 243 are provided on the shift lever 240, as shown in FIG. 17, and are electrically connected to an electric energy storage device 258 and an automatic transmission controller 252 (which will be described), as shown in FIG. 19. When the shift lever 240 is operated to the manual-mode position "DM", this fact is detected by a MANUAL MODE switch 241 also connected to the automatic transmission controller 252, as shown in FIG. 11. The SHIFT-UP and SHIFT-DOWN switches 242, 243 are positioned on the shift lever 240 such that the switch 242 can be easily turned on by depression with the thumb, while the switch 243 can be easily turned by depression with the litter or ring finger. When the finger pressure is released from these switches 242, 243, the switches are automatically turned off. The switches 242, 243 are made operable when the MANUAL MODE switch 241 is turned ON, namely, when the shift lever 240 is placed in the manual-mode position "DM". In this condition, the automatic transmission 218 is shifted up one position each time the SHIFT-UP switch 242 is depressed, and shifted down one position each time the SHIFT-DOWN switch 243 is depressed.

Figure 13:
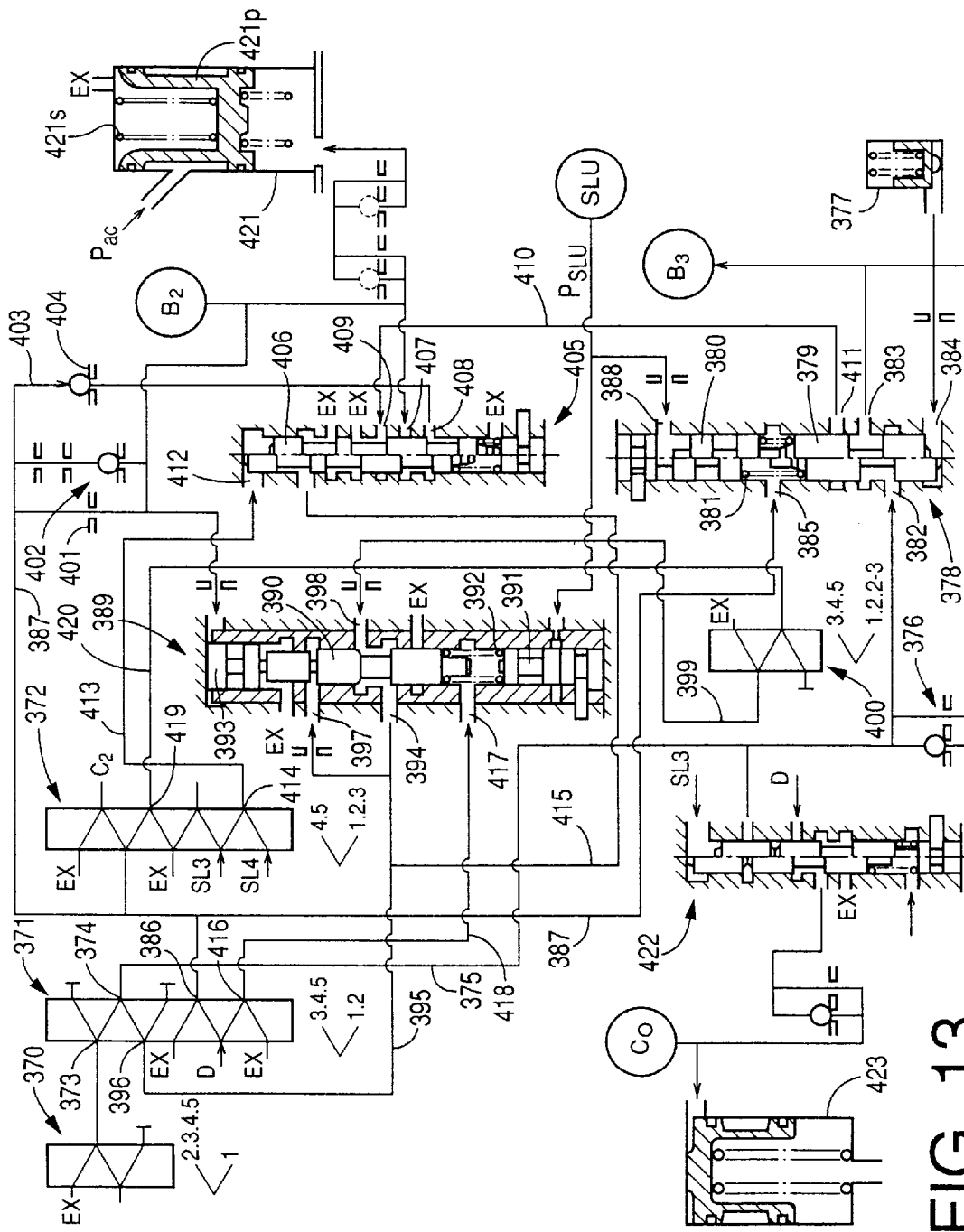
FIG. 13 is a view showing a part of a hydraulic system of the automatic transmission in the hybrid drive system of FIG. 10.

Referring to FIG. 13, there is shown the hydraulic control device 244. In this figure, reference numerals 370, 371 and 372 denote a 1-2 shift valve, a 2-3 shift valve and a 3-4 shift valve, respectively. Working fluid communications of ports of these shift valves 370, 371, 372 are indicated below the shift valves as shown in FIG. 13 in which the five forward-drive positions "1st", "2nd", "3rd", "4th" and "5th" are represented as "1", "2", "3","4" and "5", respectively.

The 2-3 shift valve 371 has an input port 373 and a brake port 374 which communicate with each other when the automatic transmission 218 is placed in the first-speed position "1st" or the second-speed position "2nd". The above-indicated third brake B3 is connected to the brake port 374 through an oil passage 375. The oil passage 375 has an orifice 376, and a damper valve 377 is connected between the orifice 376 and the third brake B3. The damper valve 377 functions to absorb a small amount of the working oil to thereby achieve a damping action upon an abrupt rise of a line pressure PL applied to the third brake B3.

Reference numeral 378 in FIG. 13 denotes a B-3 control valve which is provided to directly regulate the engaging pressure of the third brake B3. The B-3 control valve 378 includes a spool 379, a plunger 380, and a spring 381 disposed between the spool 379 and the plunger 380. The B-3 control valve 378 has an input port 382 which is opened and closed by the spool 379 and to which the oil passage 375 is connected, and an output port 383 which is selectively communicable with the input port 382 and to which the third brake B3 is connected. The output port 382 is connected to a feedback port 384 which is partially defined by one end of the spool 379. the B-3 control valve 378 further has a port 385 communicating with a chamber in which the spring 379 is disposed. The 2-3 shift valve 371 has a port 386 which produces a hydraulic pressure output (line pressure PL) when the automatic transmission 218 is placed in one of the forward-drive positions "3rd", "4th" and "5th". The port 386 is connected to the port 385 of the B-3 control valve 378 through an oil passage 387. The B-3 control valve 378 further has a control port 388 adjacent to one end of the plunger 380, and a linear solenoid valve SLU (FIG. 11) is connected to the control port 388, so that a pilot pressure $P_{SLU}$ generated by the linear solenoid valve SLU is applied to the control port 388. In this arrangement, the hydraulic pressure is regulated by the B-3 control valve 378, on the basis of the elastic force of the spring 381 and the hydraulic pressure applied to the port 385. The elastic force of the spring 381 increases with an increase in the pilot pressure $P_{SLU}$ applied to the control port 388.

Reference numeral 389 in FIG. 13 denotes a 2-3 timing valve which includes a spool 390, a first plunger 391, a spring 392 disposed between the spool 390 and the first plunger 391, and a second plunger 393 disposed on the side of the spool 390 remote from the first plunger 391. the spool 390 has a small-diameter land and two large-diameter lands having a larger diameter than the small-diameter land. The 2-3 timing valve 389 has a port 394 formed at an intermediate portion thereof. An oil passage 395 is connected to the port 394, and to a port 396 of the 2-3 shift valve 371, which port 396 is communicated with the brake port 374 when the automatic transmission 218 is placed in one of the forward-drive positions "3rd", "4th" and "5th". The oil passage 395 has a branch connected through an orifice to a port 397 of the 2-3 timing valve 389, which port 397 is open between the above-indicated small-diameter land one of the two large-diameter lands of the spool 390. The 2-3 timing valve 389 further has a port 398 which is selectively communicable with the above-indicated port 394 and which is connected through an oil passage 399 to a solenoid relay valve 400. The 2-3 timing valve 389 further has a port which is adjacent to one end of the first plunger 391 and which is connected to the linear solenoid valve SLU, and another port which is adjacent to one end of the second plunger 393 and which is connected through an orifice to the second brake B2.

The above-indicated oil passage 387 is provided to supply the working oil to the second brake B2 and to discharge the oil from this second brake B2. The oil passage 387 is provided with an orifice 401 having a small diameter, and an orifice 402 with a check ball. The oil passage 387 has a branch 403 which is provided with an orifice 404 having a large diameter. The orifice 404 is provided with a check ball which is moved to an open position when the oil is discharged from the second brake B2. The branch 403 is connected to an orifice control valve 405 described below.

The orifice control valve 405 is provided to control the rate of discharge flow of the oil from the second brake B2. This orifice control valve 405 includes a spool 306, and has a port 407 at an intermediate position. The port 407 is opened and closed by the spool 406 and connected to the second brake B2. The orifice control valve 405 further has a port 408 formed at a position below the port 407 as seen in FIG. 13. The above-indicated branch 403 of the oil passage 387 is connected to the port 408. The orifice control valve 405 further has a port 408 formed at a position above the port 407 as seen in FIG. 13. This port 408 is selectively communicable with a drain port and is connected through an oil passage 410 to a port 411 of the B-3 control valve 378. The port 411 is selectively communicable with the output port 383 to which the third brake B3 is connected.

The orifice control valve 405 further has a control port 412 formed adjacent to one end of the spool 406 remote from the spring which acts on the spool 406. This control port 412 is connected through an oil passage 413 to a port 414 of the 3-4 shift valve 372. This port 414 produces an output pressure of the third solenoid-operated valve SL3 when the automatic transmission 218 is placed in any one of the forward-drive positions "3rd", "2nd" and "1st", and produces an output pressure of the fourth solenoid-operated valve SL4 when the automatic transmission 218 is placed in the fourth-speed position "4th" or fifth-speed position "5th". The oil passage 395 has a branch 415 which is connected to the orifice control valve 405. The branch 415 is selectively communicable with the drain port of the orifice control valve 405.

The 2-3 shift valve 371 has a port 416 which produces the hydraulic pressure output (line pressure PL) when the automatic transmission 318 is placed in the first-speed position "1st" or second-speed position "2nd". This port 416 is connected through an oil passage 418 to a port 317 of the 2-3 timing valve 389 which is open to a chamber in which the spring 392 is disposed. The 3-4 shift valve 372 has a port 419 which is communicated with the above-indicated oil passage 387 when the automatic transmission 218 is placed in any one of the positions "3rd", "2nd" and "1st". The port 419 is connected through an oil passage 420 to a solenoid relay valve 400.

Reference numeral 421 in FIG. 13 denotes an accumulator for the second brake B2. The accumulator 421 has a back-pressure chamber to which is applied an accumulator control pressure Pac which is regulated on the basis of an output pressure of a linear solenoid valve SLN (FIG. 11). When the 2-3 shift valve 371 is activated to shift the automatic transmission 218 from the second-speed position "2nd" to the third-speed position "3rd", the hydraulic pressure output (line pressure PL) of the 2-3 shift valve 371 is applied to the second brake B2 through the oil passage 387. With the line pressure PL applied to the second brake B2, a piston 421p of the accumulator 421 begins to be moved upward. As this piston 421p is moved upward, an engaging pressure PB2 supplied to the brake B2 is increased to a level at which a force based on the pressure PB2 is substantially equal to a sum of a downward biasing force of the spring 421s and a force based on the above-indicated accumulator control pressure Pac which biases the piston 421p downward. Described more precisely, the engaging pressure PB2 gradually rises as the spring 321p is compressed and deformed, and reaches the line pressure PL when the piston 421p reaches its upper stroke end. Namely, the engaging pressure PB2 during the upward movement of the piston 421p is determined by the accumulator control pressure Pac.

As described above, the accumulator control pressure Pac is applied to the accumulator 421 for the second brake B2 which is engaged when the automatic transmission 218 is shifted to the third-speed position "3rd". This accumulator control pressure Pac is also applied to the following accumulators (not shown): accumulator for the clutch C1 which is engaged when the automatic transmission 218 is placed in the first-speed position "1st"; accumulator for the clutch C2 which is engaged when the automatic transmission 218 is placed in the fourth-speed position "4th"; and accumulator for the brake B0 which is engaged when the automatic transmission 218 is placed in the fifth-speed position "5th".

Reference numeral 422 in FIG. 13 denotes a C-0 exhaust valve, and reference numeral 423 denotes an accumulator for the clutch C0. The C-0 exhaust valve 422 is operated to place the clutch C0 in the engaged state for applying an engine brake to the vehicle when the automatic transmission 218 is shifted to the second-speed position "2nd" while the shift lever 240 is placed in the position In the hydraulic control device 244 constructed as described above, the hydraulic pressure in the third brake B3 during a releasing action thereof and the hydraulic pressure in the second brake B2 during an engaging action thereof are controlled on the basis of the torque of the input shaft 226 when the automatic transmission 218 is shifted up from the second-speed position "2nd" to the third-speed position "3rd", that is, when the third brake B3 is released while the second brake B2 is engaged. Therefore, the shifting shock is suitably reduced in the present arrangement. Upon other shifting actions of the automatic transmission 218, too, the hydraulic pressures in the clutches C1, C2 and brake B0 during their engaging or releasing actions are controlled by regulation of the accumulator control pressure Pac by controlling the duty cycle of the linear solenoid valve SLN.

As shown in FIG. 11, the hybrid drive system 120 includes a hybrid drive controller 250 as well as the automatic transmission controller 252 indicated above. Each of these controllers 250, 252 is constituted principally by a microcomputer incorporating a central processing unit (CPU), a random-access memory (RAM), and a read-only memory (ROM). The controllers 250, 252 receive output signals of various detectors or sensors which include: an accelerator sensor 262 for detecting an operating amount $\theta_{AC}$ of an accelerator pedal; a motor speed sensor 264 for detecting speed $N_M$ of the motor/generator 214; a motor ammeter 265 for detecting an electric current of the motor/generator 14, which indicates torque $T_M$ of the motor 214; an engine speed sensor 266 for detecting speed $N_E$ of the engine 212; a throttle sensor 268 for detecting the opening angle of a throttle valve, which indicates torque $T_E$ of the engine 212; a vehicle speed sensor 270 for detecting speed $N_O$ of the output shaft 219 of the automatic transmission 18, which indicates running speed V of the motor vehicle; a brake switch 272 for detecting an operation of a brake pedal; a shift position sensor 274 for detecting the currently selected position of the shift lever 240; an input shaft speed sensor 276 for detecting speed $N_I$ of the input shaft 226 of the automatic transmission 218; and a SHIFT PATTERN selector switch 278 for detecting a currently selected shift pattern of the automatic transmission 16. The operating amount $\theta_{AC}$ of the accelerator pedal represents the output of the hybrid drive system 210 required by the vehicle operator. As is apparent from the following description, the SHIFT PATTERN selector switch 278 cooperates with the shift lever 240 having the manual-mode position "DM, to provide drivability performance selecting means for selecting one of a plurality of drivability modes of the motor vehicle. More particularly explained, the selector switch 278 is provided to select either a POWER DRIVE shift pattern or a NORMAL DRIVE shift pattern. When the POWER DRIVE shift pattern is selected, the automatic transmission 218 is controlled by the automatic transmission controller 252, such that the transmission 218 is shifted so as to assure a relatively high degree of drivability of the vehicle. When the NORMAL DRIVE shift pattern is selected, the transmission 218 is controlled to be shifted so as to assure a relatively high degree of fuel economy of the vehicle.

The automatic transmission controller 252 is adapted to receive the output signals of the MANUAL MODE switch 241, SHIFT-UP switch 242 and SHIFT-DOWN switch 243, which have been described.

Figure 14:
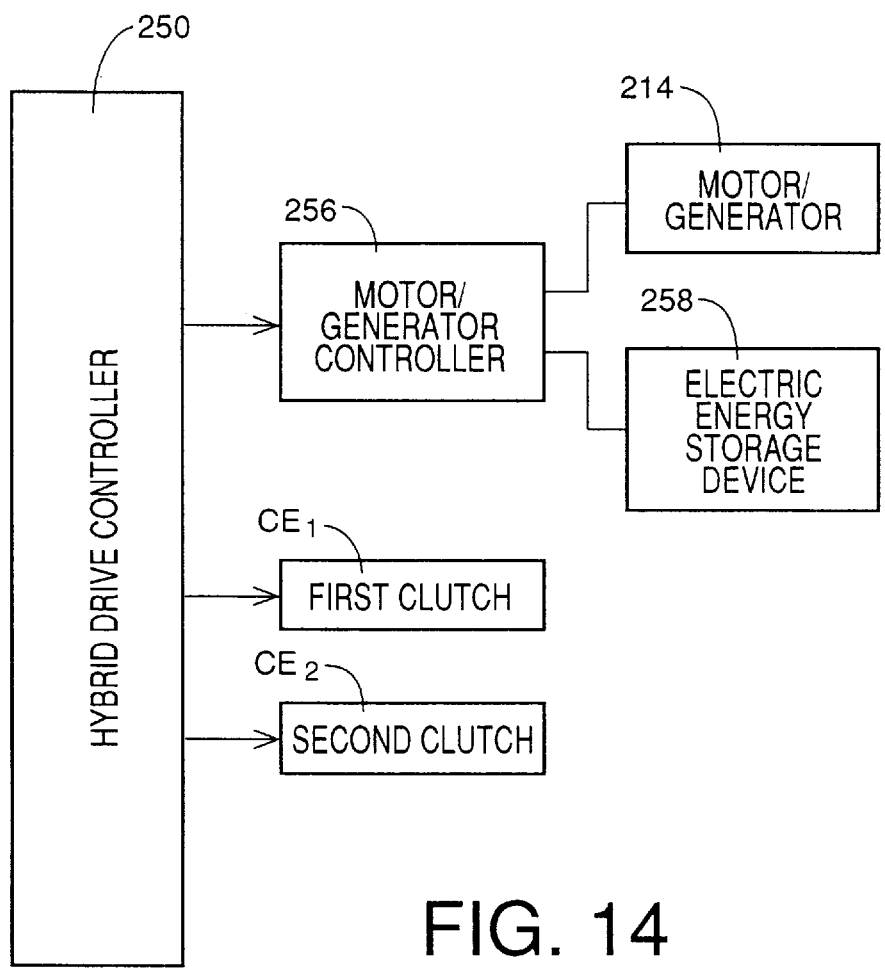
FIG. 14 is a block diagram showing connection between a hybrid drive controller and an electrically operated torque converter shown in FIG. 10.

The hybrid drive controller 250 is adapted to control the opening angle of the throttle valve, and the fuel injection and ignition timing of the engine 212, so that the output of the engine 212 is controlled depending upon the specific running condition of the vehicle. The motor/generator 214 is connected to an electric energy storage device 258 through a motor/generator controller 256, as indicated in FIG. 14. The hybrid drive controller 250 is adapted to control the motor/generator controller 256 to place the motor/generator 214 selectively in one of a DRIVE state, a CHARGING state and a NON-LOAD or FREE state. In the DRIVE state, the motor/generator 214 is operated as an electric motor to provide a predetermined torque, with an electric energy being supplied thereto from the electric energy storage device 258. In the CHARGING state, the motor/generator 214 is operated as an electric generator or dynamo, by regenerative braking (i.e., electric braking torque of the motor/generator per se), so as to charge the electric energy storage device 258 with the electric energy. In the NON-LOAD or FREE state, the motor/generator 214 is placed in a non-load condition permitting free rotation of the rotor shaft 214r.

The first and second clutches CE1, CE2 are controlled by the hybrid drive controllers 250 through solenoid-operated valves of the hydraulic circuit. The automatic transmission 218 is controlled by the automatic transmission controller 252 through the above-indicated solenoid-operated valves SL1–SL4 and linear solenoid valves SLU, SLT and SLN of the hydraulic control device 244, so that the automatic transmission 218 is shifted to the optimum position depending upon the running condition of the vehicle, for example, depending upon the operation amount $\theta_{AC}$ of the accelerator pedal and the vehicle running speed V, and according to the POWER DRIVE or NORMAL DRIVE shift pattern which is selected by the SHIFT PATTERN selector switch 278.

Figure 15:
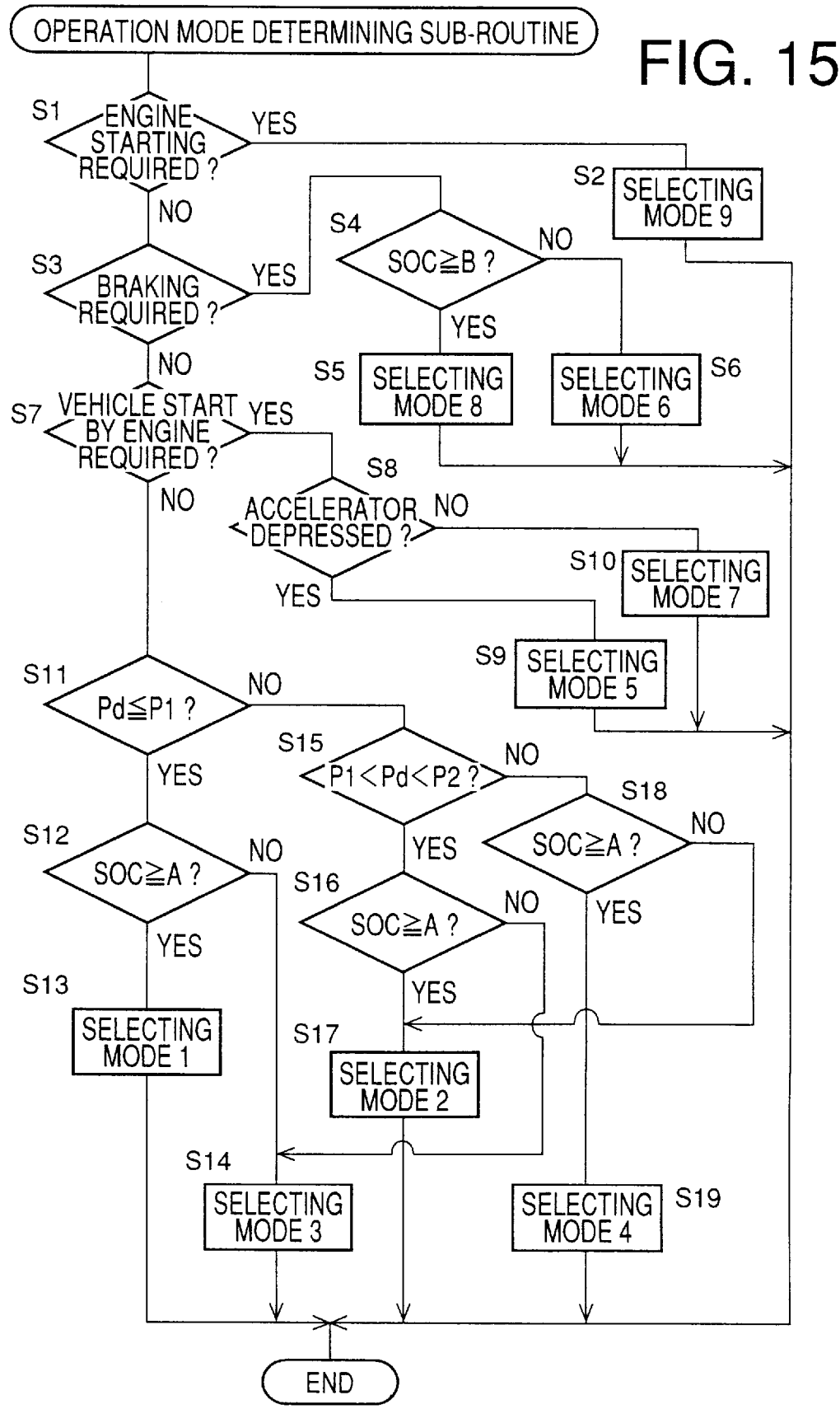
FIG. 15 is a flow chart illustrating an operation mode determining sub-routine executed by a hybrid drive controller of the hybrid drive system of FIG. 10.

The hybrid drive controller 50 is adapted to execute an operation mode determining sub-routine illustrated in the flow chart of FIG. 15, for selecting one of nine operation modes of the hybrid drive system 210 indicated in FIG. 16, and for operating the engine 212 and the electrically controlled torque converter 224 in the selected mode, as disclosed in U.S. patent application Ser. No. 08/746,483 filed Nov. 12, 1996. As shown in FIG. 11, the hybrid drive controller 250 is adapted to receive the output signals of the various sensors described above. The engine torque $T_E$ can be obtained from the opening of the throttle valve as detected by the throttle sensor 268, or from the amount of fuel injection into the engine 212. The motor torque $T_M$ can be obtained from the electric current of the motor/generator 214 as detected by the motor ammeter 265. An amount of electric energy SOC stored in the electric energy storage device 258 can be obtained from the electric current or charging efficiency of the motor/generator 214 when it is operated as the electric generator to charge the storage device 258.

The operation mode determining sub-routine of FIG. 15 is initiated with step S1 to determine whether there exists a command requiring the engine 212 to be started, for driving the vehicle with the engine 212 used as the drive power source or for operating the motor/generator 214 for charging the electric energy storage device 58. If an affirmative decision (YES) is obtained in step S1, the control flow goes to step S2 to select an operation mode 9. In this operation mode 9, the first and second clutches CE1, CE2 are both engaged (turned ON) as indicated in the table of FIG. 16, and the motor/generator 214 is operated to start the engine 212 through the planetary gear device 216, with the fuel injection amount and other conditions of the engine 210 being suitably controlled. When this operation mode 9 is selected while the vehicle is stationary, the starting of the engine 212 is effected with the automatic transmission 218 placed in the neutral position "N"When the operation mode 9 is selected during running of the vehicle with the motor/generator 214 as the drive power source as in an operation mode 1 in which the first clutch CE1 is in the released state, the first clutch CE1 is engaged, and the motor/generator 214 is operated so as to provide an output which is larger than the output necessary to drive the vehicle by a given surplus amount, so that the engine 212 is started by the surplus output of the motor/generator 214. Thus, even when the vehicle is running, the engine 212 can be started in the operation mode 9 by temporarily placing the automatic transmission 218 in the neutral position.

If a negative decision (NO) is obtained in step S1, that is, if no command requiring the starting of the engine 212 is present, the control flow goes to step S3 to determine whether brake application to the vehicle is required. For example, this determination may be effected by determining (a) whether a braking system of the vehicle is activated (whether the brake pedal has been depressed) or not, (b) whether the shift lever 240 is placed in the engine braking position "L" or "2" or in the manual-mode position with the operation amount $\theta_{AC}$ of the acceleration pedal being zero, or (c) whether the operation amount $\theta_{AC}$ of the accelerator pedal is zero. In the engine braking position "L" or "2", an engine brake is generally applied to the vehicle when the operation amount $\theta_{AC}$ of the accelerator pedal is zero. If an affirmative decision (YES) is obtained in step S3, the control flow goes to step S4 to determine whether the amount of electric energy SOC stored in the electric energy storage device 258 is equal to or larger than a predetermined upper limit B. If an affirmative decision (YES) is obtained in step S4, the control flow goes to step S5 to select an operation mode 8. If a negative decision (NO) is obtained in step S4, the control flow goes to step S6 to select an operation mode 6. The upper limit B is an upper limit of the stored electric energy amount SOC below which the electric energy storage device 258 is permitted to be charged. The upper limit B is determined depending upon the charging and discharging efficiencies of the electric energy storage device 258. For instance, the upper limit B is about 80% of the full capacity of the electric energy storage device 258.

In the operation mode 8 selected in step S5, the first and second clutches CE1, CE2 are both engaged (turned ON), as indicated in the table of FIG. 16, and the motor/generator 214 is placed in the NON-LOAD state. Further, the engine 212 is turned OFF, that is, the throttle valve is closed, and the fuel injection amount if zeroed. As a result, an engine brake due to the drag resistance of the engine 212 is applied to the vehicle, whereby the required amount of operation of the brake pedal by the vehicle operator is reduced, facilitating the control of the vehicle running. Since the motor/generator 214 is placed in the NON-LOAD state and permitted to rotate freely in the operation mode 8, the electric energy storage device 258 is protected from excessive charging and resulting deterioration of its charging and discharging efficiencies.

In the operation mode 6 selected in step S6, the first clutch CE1 is released (turned OFF) and the second clutch CE2 is engaged (turned ON), while the engine 212 is turned OFF, and the motor/generator 214 is placed in the CHARGING state, as indicated in the table of FIG. 16, whereby the motor/generator 214 is driven by a kinetic energy of the motor vehicle, so as to charge the electric energy storage device 258 while applying a regenerative brake to the vehicle. The regenerative braking reduces the required amount of operation of the brake pedal and facilitates the control of the vehicle running. Since the engine 212 is disconnected from the planetary gear device 16 with the first clutch CE1 placed in the released state, the energy loss of the vehicle due to the drag resistance of the engine 212 is prevented in the operation mode 6. Further, since the operation mode 6 is selected when the stored electric energy amount SOC is smaller than the upper limit B, the electric energy storage device 258 is protected from excessive charging and resulting deterioration of its charging and discharging efficiencies.

If a negative decision (NO) is obtained in step S3, that is, if no command requiring brake application to the vehicle is present, the control flow goes to step S7 to determine whether the vehicle is required to be started by operation of the engine 212. This determination may be effected by determining whether the vehicle is in a temporary stop during running of the vehicle with the engine 212 used as the drive power source as in an operation mode 3 (which will be described). For instance, the temporary stopping of the vehicle can be detected by checking if the output speed $N_O$ of the output shaft 219 of the automatic transmission 218 is zero. Namely, the output shaft speed $N_O$ is zero when the vehicle is stationary. If an affirmative decision (YES) is obtained in step S7, the control flow goes to step S8 to determine whether the accelerator pedal is in a depressed state, more specifically, whether the operation amount $\theta_{AC}$ of the accelerator pedal is larger than a predetermined lower limit which is close to zero but larger than zero. If an affirmative decision (YES) is obtained in step S8, that is, if the accelerator pedal is in a depressed state, the control flow goes to step S9 to select an operation mode 5. If a negative decision (NO) is obtained in step S8, the control flow goes to step S10 to select an operation mode 7.

In the operation mode 5 selected in step S9, the first clutch CE1 is engaged (turned ON) and the second clutch CE2 is released (turned OFF), and the engine 212 is operated, as indicated in the table of FIG. 16, whereby the vehicle is started by the engine 212, with the regenerative braking torque of the motor/generator 214 being suitably controlled. Described in detail, the ratios of the engine torque $T_E$ output torque of the planetary gear device 16 and motor torque $T_M$ are 1:(1+ρE):ρE, where ρE represents a gear ratio of the planetary gear device 216 (ρ=number of teeth of the sun gear 16s divided by number of teeth of the ring gear 216r). When the gear ratio ρE is about 0.5 (as in a common planetary gear device), for example, the torque of the motor/generator 214 is controlled to be equal to a half of the engine torque $T_E$, so that the torque about 1.5 times the engine torque $T_E$ is produced from the carrier 216c of the planetary gear device 216. In other words, the vehicle is started with a torque as large as (1+ρE)/ρE times the torque of the motor/generator 214. If the motor/generator 214 is held in the NON-LOAD state with no current applied to the motor, the output of the carrier 216c is zeroed with the rotor shaft 214r merely rotating in the reverse direction, whereby the vehicle is held stationary. In this case, the planetary gear device 216 functions as a vehicle start clutch and a torque booster. With the motor torque $T_M$ (regenerative braking torque) gradually increased from zero to increase a reaction force of the motor/generator 214, the vehicle can be smoothly started with the output torque which is (1+ρ) times the engine torque $T_E$.

The motor/generator 214 used in the hybrid drive system 210 of the present embodiment has a torque capacity which is about ρE times the maximum torque of the engine 212. Namely, the torque capacity and size of the motor/generator 214 are minimized to minimize the size and cost of manufacture of the hybrid drive system 210, while assuring the required torque. The present hybrid drive system 210 is further adapted so that the opening angle of the throttle valve and the fuel injection amount are increased with an increase in the motor torque $T_M$, for preventing stalling of the engine 212 due to a drop of the engine speed $N_E$ due to an increase in the reaction force of the motor/generator 214.

In the operation mode 7 selected in step S10, the first clutch CE1 is engaged (turned ON) and the second clutch CE2 is released (turned OFF), and the engine 212 is operated while the motor/generator 214 is placed in the NON-LOAD state so that the hybrid drive system 210 is placed in an electrically neutral state, as indicated in the table of FIG. 16. In this operation mode 7, the output of the carrier 216c is zeroed with the rotor shaft 214r of the motor/generator 214 rotating freely in the reverse direction. When this operation mode 7 is established during running of the vehicle with the engine 212 operated as the drive power source as in the operation mode 3, the stopping of the vehicle does not require the engine 212 to be turned OFF, and the vehicle can be started by the engine 210 as in the operation mode 5.

If a negative decision (NO) is obtained in step S7, that is, if the starting of the vehicle by the engine 212 is not required, the control flow goes to step S11 to determine whether a currently required output Pd of the hybrid drive system 210 is equal to or smaller than a predetermined first threshold value P1. The currently required output Pd is an output of the hybrid drive system 210 required to drive the vehicle against a running resistance. This currently required output Pd is calculated according to a predetermined data map or equation, on the basis of the operation amount $\theta_{AC}$ of the accelerator pedal, a rate of change of this value $\theta_{AC}$, or the currently established operating position of the automatic transmission 218. The accelerator operation amount $\theta_{AC}$ per se may be used as the currently required output Pd. The predetermined first threshold value P1 is a boundary value of the output above which the vehicle is driven with only the engine 212 used as the drive power source and below which the vehicle is driven with only the motor/generator 214 as the drive power source. In other words, the vehicle is considered to be in a medium-load or high-load running state if the currently required output Pd is larger than the first threshold value P1, and in a low-load running state if the currently required output Pd is equal to or smaller than the first threshold value P1. For example, the first threshold value P1 is determined by experiments, so as to minimize the exhaust gas emissions and the fuel consumption, depending upon the energy efficiency during running of the vehicle (in which the electric energy storage device 258 may be charged by operation of the engine 212). If the currently required output Pd is equal to or smaller than the first threshold value P1, the control flow goes to step S12 to determine whether the stored electric energy amount SOC is equal to or larger than a predetermined lower limit A. If an affirmative decision (YES) is obtained in step S12, the control flow goes to step S13 to select an operation mode 1. If a negative decision (NO) is obtained in step S12, the control flow goes to step S14 to select an operation mode 3. The lower limit A is a lower limit of the stored electric energy amount SOC above which the electric energy stored in the storage device 258 can be used to operate the motor/generator 14 as the drive power source. The lower limit A is determined depending upon the charging and discharging efficiencies of the storage device 258. For instance, the lower limit A is about 70% of the full capacity of the storage device 258.

In the operation mode 1 selected in step S13, the first clutch CE1 is released (turned OFF) and the second clutch CE2 is engaged (turned ON), and the engine 212 is turned OFF, while the motor/generator 214 is operated so as to provide the currently required output Pd, as indicated in the table of FIG. 16, so that the vehicle is driven with only the motor/generator 214 used as the drive power source. In this operation mode 1, too, the engine 212 is disconnected from the planetary gear device 216, so that the energy loss due to the drag resistance of the engine 212 is prevented as in the operation mode 6, and the motor can be suitably operated with high efficiency with the automatic transmission 218 being suitably shifted. It is also noted that the operation mode 1 is selected, that is, the motor/generator 214 is used as the drive power source, when the currently required output Pd is equal to or smaller than the first threshold value P1 while the electric energy amount SOC stored in the storage device 258 is equal to or larger than the lower limit A. In this condition, the energy efficiency is higher and the fuel consumption and the amount of exhaust emissions can be made smaller when the vehicle is driven by the motor/generator 214 (in the operation mode 1) than when the vehicle is driven by the engine 212 (in the operation mode 2). Further, the electric energy storage device 258 is protected from excessive energy consumption with the stored electric energy amount SOC falling below the lower limit A, which would result in deterioration of the charging and discharging efficiencies of the storage device 258.

In the operation mode 3 selected in step S14, the first and second clutches CE1, CE2 are both engaged (turned ON), and the engine 212 is turned ON, while the motor/generator 214 is placed in the CHARGING state to charge the electric energy storage device 258 with regenerative braking, as indicated in the table of FIG. 16, whereby the vehicle is driven by the output of the engine 212 while the electric energy storage device 258 is charged with the electric energy generated by the motor/generator 214. In this operation mode 3, the engine 212 is operated so as to provide an output larger than the currently required output Pd, and the electric current of the motor/generator 214 is controlled so that a surplus output of the engine 212 is consumed by the motor/generator 214 to charge the storage device 258.

If a negative decision (NO) is obtained in step S11, that is, if the currently required output Pd is larger than the first threshold value P1, the control flow goes to step S15 to determine whether the currently required output Pd is smaller than a predetermined second threshold P2 which is larger than the first threshold P1, that is, whether the currently required output Pd is larger than the first threshold P1 and smaller than the second threshold P2, namely, within a predetermined range between P1 and P2. This second threshold value P2 is a boundary value of the output below which the vehicle is driven with only the engine 212 used as the drive power source and above which the vehicle is driven with both the engine 212 and the motor/generator 214 as the drive power sources. In other words, the vehicle is considered to be in the medium-load running state if the currently required output Pd is smaller than the second threshold value P2, and in the high-load running state if the currently required output Pd is equal to or larger than the second threshold value P2. For example, the second threshold value P2 is determined by experiments, so as to minimize the exhaust gas emissions and the fuel consumption, depending upon the energy efficiency during running of the vehicle (in which the electric energy storage device 258 may be charged by operation of the engine 212). If the currently required output Pd is larger than the first threshold P1 and smaller than the second threshold P2, that is, if an affirmative decision (YES) is obtained in step S15, the control flow goes to step S16 to determine whether the storage electric energy amount SOC is equal to or larger than the above-indicated predetermined lower limit A. If an affirmative decision (YES) is obtained in step S16, the control flow goes to step S17 to select an operation mode 2. If a negative decision (NO) is obtained in step S16, the control flow goes to step S14 to select the operation mode 3 discussed above. If the currently required output Pd is equal to or larger than the second threshold P2, that is, if a negative decision (NO) is obtained in step S15, the control flow goes to step S18 to determine whether the stored electric energy amount SOC is equal to or larger than the lower limit A. If an affirmative decision (YES) is obtained in step S18, the control flow goes to step S19 to select an operation mode 4. If a negative decision (NO) is obtained in step S18, the control flow goes to step S17 to select the operation mode 2.

In the operation mode 2 selected in step S17, the first and second clutches CE1, CE2 are both engaged (turned ON), and the engine 12 is operated so as to produce the currently required output Pd, while the motor/generator 214 is placed in the NON-LOAD state, as indicated in FIG. 16, whereby the vehicle is driven with only the engine 212 used as the drive power source. In the operation mode 4 selected in step S19, the first and second clutches CE1, CE2 are both engaged (turned ON), and the engine 212 and the motor/generator 14 are both operated, as indicated in the table of FIG. 16, whereby the vehicle is driven with both the engine 212 and the motor/generator 14 used as the drive power sources. It will be understood that a portion of the hybrid drive controller 250 assigned to implement step S19 constitutes fourth operation mode control means for controlling the hybrid drive system 210 in a fourth operation mode which is the operation mode 4 described above. In this operation mode 4 selected when the currently required output Pd is equal to the second threshold P2 or larger, the engine 212 and the motor/generator 214 are both operated as the drive power sources to drive the vehicle, so that the energy efficiency is less likely to be lowered than in the operation mode 1 or 2 in which either the engine 212 or the motor/generator 214 is used as the drive power source. In this respect, the fuel consumption and the exhaust gas emissions can be made smaller in this operation mode 4 than in the operation mode 1 or 2 when the currently required output Pd is equal to the second threshold P2 or larger. Further, since the operation mode 4 is selected only when the stored electric energy amount SOC is equal to or larger than the lower limit A, the electric energy storage device 258 is protected from excessive energy consumption with the stored energy amount SOC falling below the lower limit A, which would result in deterioration of the charging and discharging efficiencies of the storage device 258.

As described above, the operation modes 1–4 are selected in the following running states of the vehicle. When the electric energy amount SOC stored in the electric energy storage device 258 is not smaller than the lower limit A, the operation mode 1 is selected in step S13 to drive the vehicle with only the motor/generator 214 as the drive power source if the vehicle is in the low-load running state with the currently required output Pd being equal to or smaller than the first threshold P1. Further, the operation mode 2 is selected in step S17 to drive the vehicle with only the engine 212 as the drive power source if the vehicle is in the medium-load running state with the currently required output Pd being larger than the first threshold P1 and smaller than the second threshold P2, and the operation mode 4 is selected in step S19 to drive the vehicle with both of the engine 212 and the motor/generator 214 as the drive power sources if the vehicle is in the high-load running state with the currently required output Pd being equal to or larger than the second threshold P2. When the stored electric energy amount SOC is smaller than the lower limit A, the operation mode 3 is selected in step S14 to drive the vehicle with only the engine 212 as the drive power source while at the same time charging the electric energy storage device 258 if the vehicle is in the medium-load running state with the currently required output Pd being smaller than the second threshold P2, and the operation mode 2 is selected in step S17 to drive the vehicle with only the engine 212 without charging the storage device 258 if the vehicle is in the high-load running state with the currently required output Pd being equal to or larger than the second threshold P2.

The operation mode 2 is selected in step S17 in the following two cases: 1) when the vehicle is in the medium-load running state wherein the currently required output Pd is larger than the first threshold P1 and smaller than the second threshold P2, while the stored electric energy amount SOC is not smaller than the lower limit A; and 2) when the vehicle is in the high-load running state wherein the currently required output Pd is equal to or larger than the second threshold P2, while the stored electric energy amount SOC is smaller than the lower limit A. In the medium-load running state of the vehicle, the energy efficiency is generally higher when the vehicle is driven by the engine 212 than when the vehicle is driven by the motor/generator 214. Accordingly, the fuel consumption and exhaust gas emission can be made smaller in the operation mode 2 than in the operation mode 1. In the high-load running state, it is generally desirable to select the operation mode 4 in which the vehicle is driven by both of the engine 212 and the motor/generator 14. When the electric energy amount SOC stored in the electric energy storage device 258 is smaller than the lower limit A, however, it is desirable to select the operation mode 2, that is, to drive the vehicle with only the engine 212 used as the drive power source, in order to prevent deterioration of the charging and discharging efficiencies of the storage device 258 due to reduction of the stored electric energy amount SOC below the lower limit A.

Figure 20:
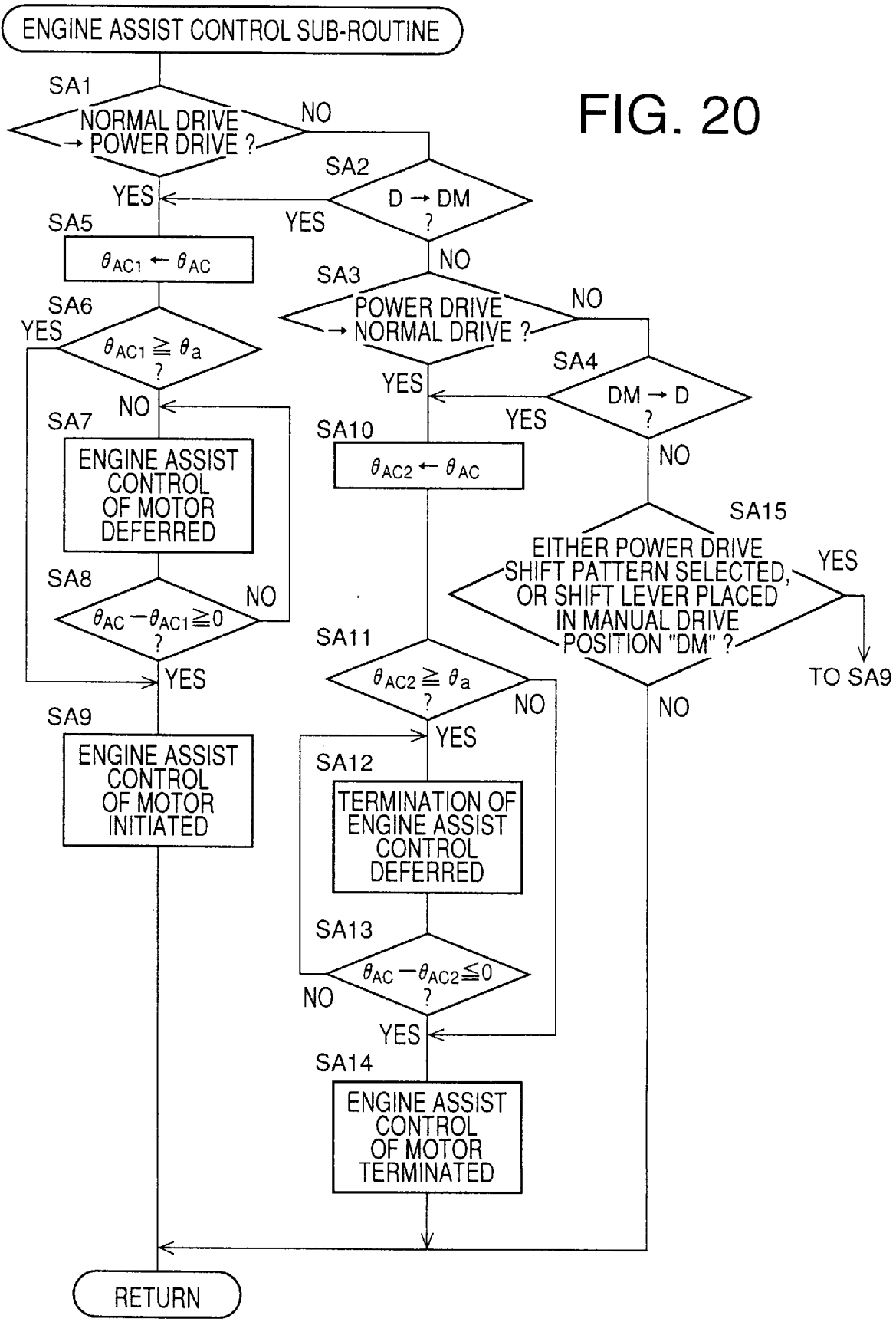
FIG. 20 is a flow chart illustrating an engine assist control sub-routine executed by the hybrid drive controller of the hybrid drive system of FIG. 10.

The hybrid drive controller 250 is further adapted to execute an engine assist control sub-routine illustrated in the flow chart of FIG. 20, independently of the operation mode determining sub-routine of FIG. 15. For instance, this sub-routine may be executed to drive the motor vehicle in an engine assist drive mode in place of the engine-motor drive mode (operation mode 4) described above. The engine-assist drive mode is a modification of the engine drive mode (operation mode 2) described above, such that the motor/generator 214 is operated as needed, as an auxiliary drive power source, together with the engine 212, to assist the engine 212 to drive the motor vehicle, during running of the vehicle with the engine 212 operated as a primary drive power source.

It will be understood that a portion of the hybrid drive controller 250 assigned to implement steps SA1–SA15 of the engine assist control sub-routine serves as engine assist control means for controlling the motor/generator 214 so as to assist the engine 212 as needed, during an engine drive mode in which the engine 212 is operated as the primary drive power source to drive the motor vehicle. To "assist the engine 212 as needed" is interpreted to mean that the motor/generator 214 is operated together with the engine 212, as the drive power source to drive the vehicle, when the cooperation of the motor-generator 212 with the engine 212 is necessary to drive the vehicle. It will also be understood that steps SA6–SA9 correspond to engine assist control initiation control means of the engine assist control means, while steps SA11–SA14 correspond to engine assist control termination control means of the engine assist control means.

The engine assist control sub-routine of FIG. 20 is initiated with step SA1 to determine whether the SHIFT PATTERN selector switch 278 is operated to change the shift pattern of the transmission 218 from the NORMAL DRIVE shift pattern to the POWER DRIVE shift pattern. If an affirmative decision (YES) is obtained in step SA1, that is, if the POWER DRIVE shift pattern is selected, the control flow goes to step SA5. If a negative decision (NO) is obtained in step SA1, the control flow goes to step SA2 to determine whether the shift lever 240 is operated from the drive position "D" to the manual-mode position "DM". This determination is effected on the basis of the output signal of the MANUAL MODE selector switch 241. If the shift lever 240 is operated to the manual-mode position "DM", the control flow goes to step SA5. If a negative decision (NO) is obtained in step SA2, the control flow goes to step SA3 to determine whether the SHIFT PATTERN selector switch 278 is operated to change the shift pattern from the POWER DRIVE shift pattern to the NORMAL DRIVE shift pattern. If an affirmative decision (YES) is obtained in step SA3, that is, the shift pattern is changed to the NORMAL DRIVE shift pattern, the control flow goes to step SA10. If a negative decision (NO) is obtained in step SA4, the control flow goes to step SA4 to determine whether the shift lever 240 is operated from the manual-mode position "DM" to the drive position "D". If the shift lever 240 is shifted to the drive position "D", the control flow goes to step SA10. If a negative decision (NO) is obtained in step SA4, the control flow goes to step SA15 to determine whether either one of the following two conditions is satisfied or not: 1) The POWER DRIVE shift pattern is selected; and 2) The shift lever 240 is placed in the manual-mode position "DM". If a negative decision (NO) is obtained in step SA15, that is, if the NORMAL DRIVE shift pattern is selected while the shift lever 240 is not placed in the manual mode position "DM", one cycle of execution of the engine assist control sub-routine of FIG. 20 is terminated. If the POWER DRIVE shift pattern is selected, or if the shift lever 240 is placed in the manual-mode position "DM", the control flow goes to step SA9 to implement an engine assist control of the motor/generator 214 in which the motor/generator 214 is operated together with the engine 212, to assist the engine 212 to drive the motor vehicle.

Step SA5 is implemented when the NORMAL DRIVE shift pattern is changed to the POWER DRIVE shift pattern is selected or when the shift lever 240 is operated to from the drive position "D" to the manual-mode position "DM". Step SA5 is provided to set the currently detected amount of operation $\theta_{AC}$ of the accelerator pedal as a reference value $\theta_{AC1}$. Step SA5 is followed by step SA6 to determine whether the reference value $\theta_{AC1}$ is equal to or larger than a lower limit $\theta_a$ below which the engine assist control of the motor/generator 214 is inhibited. If an affirmative (YES) is obtained in step SA6, that is, if the reference value $\theta_{AC1}$ set in step SA5 is equal to or larger than the lower limit $\theta_a$, the control flow goes to step SA9 to implement the engine assist control in which the motor/generator 214 is operated to assist the engine 212 as described below. If a negative decision (NO) is obtained in step SA6, that is, the value $\theta_{AC1}$ is smaller than the lower limit $\theta_a$, the control flow goes to step SA7 to defer or temporarily inhibit the engine assist control of the motor generator 214. Step SA7 is followed by step SA8 to determine whether a difference ($\theta_{AC}-\theta_{AC1}$) is equal to or larger than zero, that is to determine whether the operation amount $\theta_{AC}$ of the accelerator pedal currently detected (at the time of implementation of step SA8) is equal to or larger than the reference value $\theta_{AC1}$ which was set in step SA5. If an affirmative decision (YES) is obtained in step SA8, it means that the operation amount $\theta_{AC}$ has increased or remains constant. In this case, the control flow goes to step SA9. If a negative decision (NO) is obtained in step SA8, it means that the operation amount $\theta_{AC}$ has decreased. In this case, the control flow returns to step SA7, and steps SA7 and SA8 are repeatedly implemented until the affirmative decision (YES) is obtained in step SA8. Thus, the engine assist control in step SA9 is not initiated as long as the operation amount $\theta_{AC}$ of the accelerator pedal is in the process of decreasing. The decrease in the accelerator pedal operation amount $\theta_{AC}$ indicates that the vehicle operator desires to decrease the vehicle drive torque. In this case, the initiation of the engine assist control in step SA9 is deferred or temporarily inhibited, to prevent an unexpected increase of the vehicle drive torque by the engine assist control in step SA9.

Figure 21:
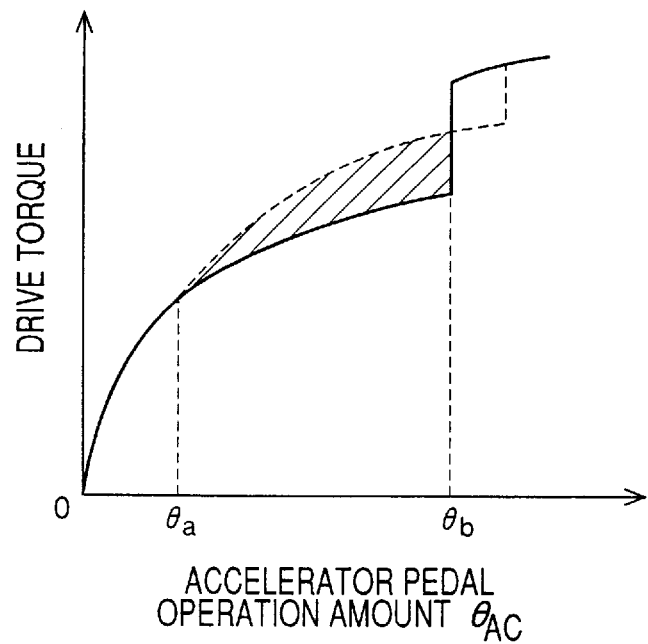
FIG. 21 is a graph indicating a relationship between vehicle drive torque and amount of accelerator pedal at a give vehicle speed, for explaining the content of engine assist control in step SA9 of the flow chart of FIG. 20.

In the engine assist control in step SA9, the torque $T_M$ of the motor/generator 214 (which will be referred to as "assist torque" where appropriate) is controlled on the basis of the operation amount $\theta_{AC}$ of the accelerator pedal, and according to a predetermined relationship between the assist torque and the operation amount $\theta_{AC}$. This relationship is represented by an engine assist data map or equation stored in the hybrid drive controller 250. The graph of FIG. 21 shows an example of relationships between the vehicle drive torque and the accelerator pedal operation amount $\theta_{AC}$, at a given running speed of the vehicle. In the graph of FIG. 21, solid line represents an ideal relationship between the accelerator pedal operation amount $\theta_{AC}$ and the engine torque $T_E$ (torque produced by the engine 212 only). This relationship is a NORMAL DRIVE relationship used in the engine drive mode (operation mode 2). Further, a dashed line in FIG. 21 represents an ideal relationship between the operation amount $\theta_{AC}$ and the sum of the engine torque $T_E$ and the motor torque $T_M$. This relationship is a POWER DRIVE relationship used in the engine assist drive mode, namely, in the engine assist control in step SA9. In the engine assist control, the motor torque $T_M$ indicated by a hatched area in the graph of FIG. 21 is added to the engine torque $T_E$. The motor torque $T_M$ to be added to the engine torque $T_E$ in the engine assist control is determined, with the output characteristics of the engine 212 taken into account, so that the overall vehicle drive torque ($T_E+T_M$) continuously smoothly increases over substantially the entire range of the operation amount $\theta_{AC}$ of the accelerator pedal, as indicated in the graph. The motor torque $T_M$ is added to the engine torque $T_E$, that is, the engine assist control is initiated when the operation amount $\theta_{AC}$ of the accelerator pedal has increased up to the lower limit $\theta_{AC}$. The motor torque $T_M$ to be added to the engine torque $T_E$, that is, the "assist torque" is determined to increase with an increase in the operation amount $\theta_{AC}$.

As described above, the engine assist control in step SA9 in which the motor/generator 214 is operated to produce the assist torque $T_M$ is implemented if the accelerator pedal operation amount $\theta_{AC}$ (at the time of implementation of step SA5) is not smaller than the lower limit $\theta_a$ after the NORMAL DRIVE shift pattern of the automatic transmission 218 is changed to the POWER DRIVE shift pattern, or after the shift lever 240 is operated from the drive position "D" to the manual-mode position "DM". That is, step SA6 is followed by step SA9. To prevent a shock due to an abrupt increase in the vehicle drive torque (sum of the engine and motor torques $T_E$, $T_M$), it is desirable that the assist torque $T_M$ be gradually increased in an initial period of the engine assist control in step SA9. The engine assist control is not implemented while the accelerator pedal operation amount $\theta_{AC}$ is smaller than the lower limit $\theta_a$, even if step SA9 is implemented as a result of the affirmative decision (YES) in step SA8.

In the graph of FIG. 21, $\theta_b$ is a shift-down threshold (at a given vehicle running speed V) of the accelerator pedal operation amount $\theta_{AC}$ above which the automatic transmission 218 is shifted down, when the NORMAL DRIVE shift pattern is selected. Described in detail, the automatic transmission 218 is shifted on the basis of the vehicle running speed V and the accelerator pedal operation amount $\theta_{AC}$ so that the transmission 218 is shifted down when the operation amount $\theta_{AC}$ exceeds the shift-down threshold $\theta_b$ when the NORMAL DRIVE shift pattern is selected. In the POWER DRIVE shift pattern, the automatic transmission 218 is generally adapted to be shifted down at a smaller value of the accelerator pedal operation amount $\theta_{AC}$ (at a higher value of the vehicle running speed V) than in the NORMAL DRIVE shift pattern. In the present second embodiment wherein the engine assist control permits a smooth increase of the vehicle drive torque as the operation amount $\theta_{AC}$ increases to a relatively large value, the shift-down threshold $\theta_b$ of the operation amount $\theta_{AC}$ is made larger in the POWER DRIVE shift pattern (in the engine assist control) than in the NORMAL DRIVE shift pattern.

While the shift lever 240 is placed in the manual-mode position "DM", the automatic transmission 218 can be manually shifted up and down by depressing the SHIFT-UP and SHIFT-DOWN switches 242, 243, as described above.

When the POWER DRIVE shift pattern is changed to the NORMAL DRIVE shift pattern, or when the shift lever 240 is operated from the manual-mode position "DM" to the drive position "D" step SA10 is implemented to set the currently detected accelerator pedal operation amount $\theta_{AC}$ as a reference value $\theta_{AC2}$. Step SA10 is followed by step SA11 to determine whether the reference value $\theta_{AC2}$ is equal to or larger than the lower limit $\theta_a$. If a negative decision (NO) is obtained in step SA11, that is, the reference value $\theta_{AC2}$ is smaller than the lower limit $\theta_a$, the control flow goes directly to step SA14 to terminate the engine assist control which was initiated in step SA9. If an affirmative decision (YES) is obtained in step SA11, the control flow goes to step SA12 to defer or temporarily inhibit the termination of the engine assist control. Step SA12 is followed by step SA13 to determine whether a difference ($\theta_{AC}-\theta_{AC2}$) is equal to or smaller than zero, namely, whether the accelerator pedal operation amount $\theta AC$ at the time of implementation of step SA13 is equal to or smaller than the reference $\theta_{AC2}$. If an affirmative decision (YES) is obtained in step SA13, the control flow goes to step SA14 to terminate the engine assist control. If a negative decision (NO) is obtained in step SA13, that is, if the operation amount $\theta_{AC}$ has increased, the control flow goes back to step SA12, and steps SA12 and SA13 are repeatedly implemented until the operation amount $\theta_{AC}$ has become equal to or smaller than the reference value $\theta_{AC2}$. The increase of the operation amount $\theta_{AC}$ indicates that the vehicle operator desires to increase the vehicle drive torque. In this case, the termination of the engine assist control in step SA14 is deferred or temporarily inhibited, that is, the engine assist control of the motor/generator 214 is continued, to prevent an unexpected decrease of the vehicle drive torque by the termination of the engine assist control.

As described above, the engine assist control of the motor/generator 214 is terminated, that is, the motor/generator 214 is turned off to remove the assist torque or motor $T_M$ (indicated by the hatched area in FIG. 21) from the overall vehicle drive torque, if the accelerator pedal operation amount $\theta_{AC}$ is smaller than the lower limit $\theta_a$, after the POWER DRIVE shift pattern is changed to the NORMAL DRIVE shift pattern, or after the shift lever 240 is operated from the manual-mode position "DM" to the drive position "D". That is step SA11 is followed by step SA14, For preventing a shock due to an abrupt decrease of the vehicle drive torque by an amount equal to the motor torque or assist torque $T_M$ by the termination of the engine assist control of the motor/generator 214 in step SA14, it is desirable that the assist torque $T_M$ be gradually decreased in step SA14.

In the present second embodiment of FIGS. 10–21, the engine assist control of the motor/generator 214 is implemented in step SA9 when the POWER DRIVE shift pattern of the automatic transmission 218 is selected by the SHIFT PATTERN selector switch 278 or when the shift lever 240 is operated to the manual-mode position "DM" (when the manual-mode position "DM" is detected by the MANUAL-MODE switch 241). In other words, the engine assist control of the motor/generator 214, that is, the operation of the hybrid drive system 210 in the engine assist drive mode is effected only when the vehicle driver desires to drive the vehicle with relatively high drivability performance, which is expressed by the POWER DRIVE shift pattern selected by the SHIFT PATTERN selector switch 268, or by the operation of the shift lever 240 to its manual-mode position "DM". In the present hybrid drive system 210, the engine assist control of the motor/generator 214 is not necessarily implemented even when the operation amount a $\theta_{AC}$ of the accelerator pedal is equal to or larger than the lower limit $\theta_a$. Thus, the present arrangement is effective to reduce the frequency of operation of the electric motor 214 and minimize the amount of consumption of the electric energy by the electric motor, while permitting the motor vehicle to be driven with drivability performance or drive force as desired by the vehicle operator.

In the present hybrid drive system 210, the engine assist control of the motor/generator 214 is initiated in step SA9 if the affirmative decision (YES) is obtained in step SA8, when the operation amount $\theta_{AC}$ of the accelerator pedal is smaller than the lower limit $\theta_a$, after the POWER DRIVE shift pattern of the automatic transmission 218 or the manual-mode position "DM" of the shift lever 240 is selected. That is, the engine assist control in step SA9 is not initiated when the operation amount $\theta_{AC}$ is in the process of decreasing. This arrangement is effective to prevent an unexpected increase in the vehicle drive torque by the initiation of the engine assist control of the electric motor 214 while the vehicle operator desires to decrease the vehicle drive torque. As indicated above, steps SA6–SA9 correspond to the engine assist control initiation control means for controlling the initiation of the engine assist control of the motor/generator 214.

Further, the engine assist control in step SA9 is terminated if the affirmative decision (YES) is obtained in step SA13, when the operation amount $\theta_{AC}$ is not smaller than the lower limit $\theta_a$, after the NORMAL SHIFT pattern of the transmission 218 or the drive position "D" of the shift lever 240 is selected. That is, the engine assist control is not terminated when the operation amount $\theta_{AC}$ is in the process of increasing. This arrangement is effective to prevent an unexpected decease in the vehicle drive torque by the termination of the engine assist control in step SA14 while the vehicle operator desires to increase the vehicle drive torque. As indicated above, steps SA11–SA14 correspond to the engine assist control termination control means for controlling the termination of the engine assist control of the motor/generator 214.

Thus, the engine assist control sub-routine of FIG. 20 is adapted to change the amount of torque which is produced by the electric motor 214 and which is used as the assist torque to be added to the torque of the engine 212, depending upon the drivability mode of the vehicle as selected by the SHIFT PATTERN selector switch 278 and the shift lever 240. The engine assist control means provided by the sub-routine of FIG. 20 includes assist torque changing means (in particular, steps SA1–SA4 and SA15) for suitably changing the assist torque of the electric motor 214 to be added to the engine torque $T_E$, depending upon the drivability mode of the vehicle selected by the vehicle operator through the SHIFT PATTERN selector switch 278 and the shift lever 240.

In the hybrid drive system 210 of the second embodiment of the invention, the SHIFT PATTERN selector switch 278 and the shift lever 240 having the manual-mode position "DM" function as the drivability performance selecting means for selecting one of a plurality of drivability modes of the vehicle.

Figure 22:
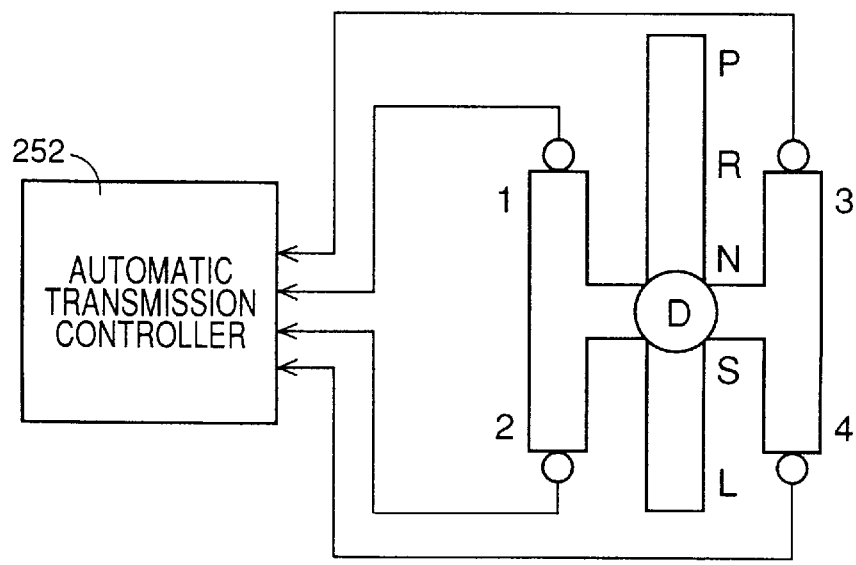
FIG. 22 is a view indicating operating positions of the shift lever in a modified form of the second embodiment of the invention.

Referring next to FIG. 22, there is shown a shift lever device wherein a shift lever has a first-speed position "1", a second-speed position "2", a third-speed position "3" and a fourth-speed position "4", to which the shift lever can be shifted from a drive position "D". When the shift lever is shifted to the positions "1", "2", "3" and "4", the automatic transmission 218 is shifted to respective forward-drive positions "1st", "2nd", "3rd" and "4th". Thus, the automatic transmission 218 can be shifted in a manual mode by the shift lever.

Figure 23:
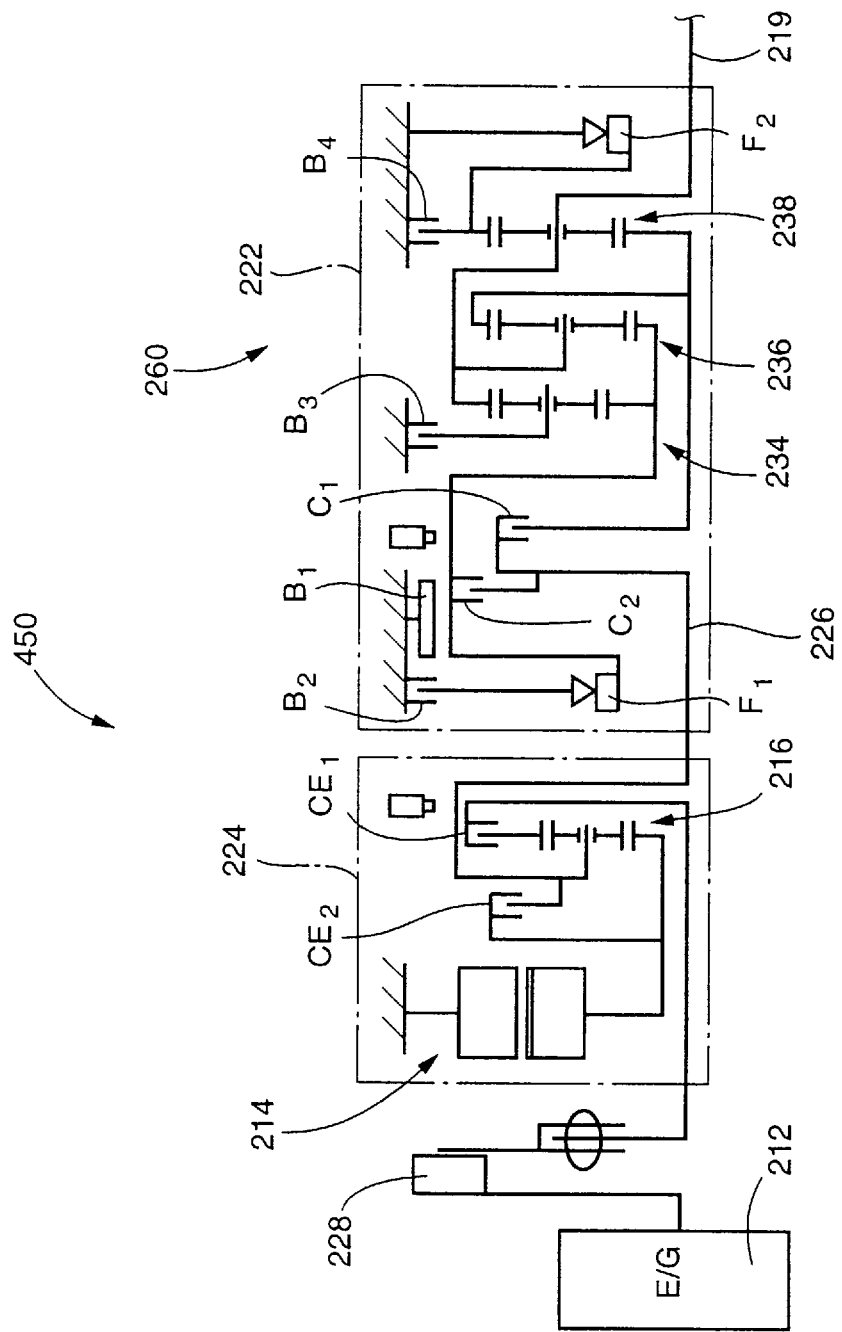
FIG. 23 is a schematic view showing a hybrid drive system according to a third embodiment of this invention.

FIGS. 23 and 24 show a hybrid drive system 450 constructed according to a third embodiment of this invention. In the hybrid drive system 210 of the second embodiment of FIGS. 10–21, the automatic transmission 218 has the first and second rear-drive positions "Rev 1" and "Rev 2". The hybrid drive system 450 shown in FIG. 23 uses an automatic transmission 260 which does not have the auxiliary transmission 220 and consists solely of the primary transmission 222. The automatic transmission 260 has four forward-drive positions and one rear-drive position, as indicated in FIG. 24.

While the presently preferred embodiments of the present invention have been described above by reference to the accompanying drawings, it is to be understood that the invention is not limited to the details of the illustrated embodiments, but may be embodied otherwise.

In the illustrated embodiments, the motor/generator 14 and motor/generator 214 function not only as the electric motor but also as the electric generator or dynamo.

However, a separate electric generator may be provided in addition to the electric motor which is operated for the sole purpose of driving the vehicle.

Although the motor/generator 14 or motor/generator 214 is used commonly for the right and left drive wheels, it may be provided for each of the drive wheels.

In the engine assist control sub-routine of FIG. 20, the engine assist control of the motor/generator 214 in step SA9 is implemented, in the two cases, that is, where the POWER DRIVE shift pattern of the automatic transmission 218 is selected by the SHIFT PATTERN selector switch 278, or where the shift lever 240 is operated to the manual-mode position "DM". While the engine assist control sub-routine of FIG. 20 is adapted such that the engine assist control is implemented in the same manner in the above two cases, the engine assist control may be implemented in different manners depending upon whether the POWER DRIVE shift pattern is selected or the shift lever is operated to the manual-mode position. For example, the amount of the assist torque $T_M$ produced by the motor/generator 214 can be changed in the two cases. The engine assist control may be implemented in only one of the two cases.

Although the sub-routine of FIG. 20 is adapted such that the engine assist control is terminated when the NORMAL DRIVE shift pattern is selected with the shift lever 240 placed in the drive position "D", the engine assist control may be effected in this case, such that the motor/generator 214 is operated so as to produce a relatively small assist torque $T_M$.

It is to be understood that the present invention may be embodied with various other changes, modifications and improvements, which may occur to those skilled in the art, without departing from the spirit and scope of the invention defined in the following claims:

What is claimed is:

1. A hybrid drive system for a motor vehicle, comprising:
   an engine operated by combustion of a fuel;
   an electric energy storage device for storing an electric energy;
   an electric motor operated with the electric energy stored in said electric energy storage device;
   normal drive control means for controlling said engine and said electric motor so as to establish a normal drive state in which one of said engine and said electric motor is operated as a drive power source to drive the motor vehicle;
   power drive control means for controlling said engine and said electric motor so as to establish a power drive state in which there is available a power drive mode in which both of said engine and said electric motor are operated as the drive power source to drive the motor vehicle;
   power drive selecting means manually operated by an operator of the motor vehicle when the operator desires to drive the motor vehicle in said power drive mode; and
   power drive restricting means for permitting said power drive control means to establish said power drive state if said power drive selecting means is not manually operated, and inhibiting said power drive control means from establishing said power drive state, to thereby inhibit the motor vehicle from being driven in said power drive mode, if said power drive selecting means is not manually operated.

2. A hybrid drive system according to claim 1, wherein said power drive restricting means commands said normal drive control means to establish said normal drive state if said power drive selecting means is not manually operated.

3. A hybrid drive system according to claim 1, further comprising:
   power drive mode inhibiting means for inhibiting said power drive control means from establishing said power drive mode and for operating only said engine as the drive power source for driving the motor vehicle, if an amount of the electric energy stored in said electric energy storage device is smaller than a predetermined lower limit, even when said power drive selecting means is manually operated; and
   indicating means for informing the operator of the motor vehicle that the motor vehicle is inhibited from being driven in said power drive mode, when said power drive control means is inhibited by said power drive mode inhibiting means from establishing said power drive mode.

4. A hybrid drive system according to claim 3, wherein said power drive mode inhibiting means establishes an engine drive and charging mode in which only said engine is operated to drive the motor vehicle and to drive said electric motor as an electric generator for charging said electric energy storage device, if the amount of the electric energy stored in said electric energy storage device is smaller than said lower limit.

5. A hybrid drive system according to claim 1, further comprising power-normal switching means operable in said power drive state, for determining whether a drive force currently required to drive the motor vehicle is smaller than a predetermined threshold, said power-normal switching means inhibiting said power drive control means from establishing said power drive mode and commanding said normal drive control means to establish said normal drive state, if said drive force currently required is smaller than said predetermined threshold.

6. A hybrid drive system for a motor vehicle, comprising:
   an engine operated by combustion of a fuel;
   an electric motor operated by an electric energy;
   engine assist control means operable in an engine assist mode, for controlling said electric motor such that said electric motor is operated as needed, as an auxiliary drive power source, together with said engine, to assist the engine to drive the motor vehicle, during running of the motor vehicle with the engine operated as a primary drive power source; and
   drivability performance selecting means manually operated by an operator of the motor vehicle, for selecting one of a plurality of drivability modes of the motor vehicle,
   and wherein said engine assist control means includes assist torque changing means for changing an amount of an assist torque which is produced by said electric motor and which is added to a torque of said engine in said engine assist mode, said assist torque changing means changing the amount of said assist torque according to said one of the drivability modes of the motor vehicle selected by said drivability performance selecting means.

7. A hybrid drive system according to claim 6, further comprising an automatic transmission, and wherein said drivability performance selecting means comprises a selector switch for selecting one of a plurality of shift patterns according to which said automatic transmission is shifted from one position to another, said shift patterns including a power drive shift pattern and a normal drive shift pattern for shifting said automatic transmission so as to drive the motor vehicle with relatively high and low degrees of drivability.

8. A hybrid drive system according to claim 6, further comprising an automatic transmission, and wherein said drivability performance selecting means comprises a shift lever for shifting said automatic transmission, said shift lever having a manual-mode position in which said automatic transmission can be manually shifted from one position to another.

9. A hybrid drive system according to claim 6, wherein said drivability performance selecting means has a first position for selecting a relatively high degree of drivability of the motor vehicle, and a second position for selecting a relatively low degree of drivability of the motor vehicle, said assist torque changing means of said engine assist control means operating said electric motor as the auxiliary drive power source when said drivability performance selecting means is placed in said first position, and inhibiting an operation of said electric motor as the auxiliary drive power source when said drivability performance selecting means is placed in said second position.

10. A hybrid drive system according to claim 6, wherein said drivability performance selecting means has a first position for selecting a relatively high degree of drivability of the motor vehicle, and a second position for selecting a relatively low degree of drivability of the motor vehicle, said assist torque changing means of said engine assist control means initiating an operation of said electric motor as the auxiliary drive power source when said drivability performance selecting means is operated to said first position, and terminating the operation of said electric motor as the auxiliary drive power source when the drivability performance selecting means is operated to said second position.

11. A hybrid drive system according to claim 6, wherein said engine assist control means further comprises engine assist control initiation control means for inhibiting initiation of an operation of said electric motor as the auxiliary drive power source when an output of said engine currently required by the vehicle operator is in the process of decreasing, and engine assist control termination control means for inhibiting termination of the operation of said electric motor as the auxiliary drive power source when said output of said engine currently required by the vehicle operator is in the process of increasing.

12. A hybrid drive system according to claim 6, wherein said assist torque changing means increases the amount of said assist torque when an output of the hybrid drive system currently required by the vehicle operator is increasing, and decreases the amount of said assist torque when said output currently required by the vehicle operator is decreasing.

* * * * *